United States Patent [19]

Gaskill, Jr. et al.

[11] 3,925,684

[45] Dec. 9, 1975

[54] UNIVERSAL LOGIC GATE

[75] Inventors: James R. Gaskill, Jr., Pacific Palisades; Don C. Devendorf, Los Angeles, both of Calif.

[73] Assignee: Hughes Aircraft Company, Culver City, Calif.

[22] Filed: Mar. 11, 1974

[21] Appl. No.: 450,114

[52] U.S. Cl. ................ 307/203; 307/207; 307/216; 307/218

[51] Int. Cl.[2] ........................................ H03K 19/08

[58] Field of Search ........... 307/207, 213, 215, 216, 307/218, 235 R, 203

[56] References Cited

UNITED STATES PATENTS

| | | | |
|---|---|---|---|
| 3,471,713 | 10/1969 | Uimari | 307/218 |
| 3,539,831 | 11/1970 | Gilbert | 307/235 R |
| 3,681,614 | 8/1972 | Kroos | 307/235 R |
| 3,728,560 | 4/1973 | Treadway | 307/235 R |
| 3,760,190 | 9/1973 | Hannaford | 307/218 |

*Primary Examiner*—John Zazworsky
*Attorney, Agent, or Firm*—R. A. Cardenas; W. H. MacAllister

[57] ABSTRACT

A universal logic gate for synthesizing all four variable logic functions in a unit time delay and for synthesizing functions of more than four variables is disclosed. The universal logic gate comprises a plurality of cascode circuits selectively coupled to a plurality of load circuits. The cascode circuit includes an upper current switch section having four current paths for a switch current. The first and second current paths of the upper current switch section are coupled to a first main current path of the lower current switch section and the third and fourth current paths of the upper current switch section are coupled to a second main current path of the lower switch section. A multibase transistor having a plurality of input terminals controls flow of switch current in the first and second main current paths in the lower current switch section. A second multi-base transistor having a plurality of input terminals controls the flow of switch current between the first and second current paths of the upper level current switch section. A third multi-base transistor having a plurality of input terminals controls the flow of current between the third and fourth current paths. Selected ones of said current paths may be wire-ANDed together and coupled to a load cell, and selected load cells of said plurality of load cells may be wire-ORed together for providing an output. Selected other load cells may provide the output complement function.

10 Claims, 19 Drawing Figures

Fig. 2.

| Input State | | | Collector Currents | | | | | | Upper Collector Voltages | | | | Output State | | | |
|---|---|---|---|---|---|---|---|---|---|---|---|---|---|---|---|---|
| X | Y | Z | $I_C(38)$ | $I_C(37)$ | $I_C(21)$ | $I_C(22)$ | $I_C(24)$ | $I_C(23)$ | $V_C(21)$ | $V_C(22)$ | $V_C(24)$ | $V_C(23)$ | $f_1$ | $f_2$ | $f_3$ | $f_4$ |
| 0 | 0 | 0 | 0 | $I_{SW}$ | 0 | 0 | 0 | $I_{SW}$ | 0 | 0 | 0 | $-I_{SW}R_L$ | 1 | 1 | 1 | 0 |
| 0 | 0 | 1 | $I_{SW}$ | 0 | 0 | $I_{SW}$ | 0 | 0 | 0 | $-I_{SW}R_L$ | 0 | 0 | 1 | 0 | 1 | 1 |
| 0 | 1 | 0 | 0 | $I_{SW}$ | 0 | 0 | $I_{SW}$ | 0 | 0 | 0 | $-I_{SW}R_L$ | 0 | 1 | 1 | 0 | 1 |
| 0 | 1 | 1 | $I_{SW}$ | 0 | 0 | $I_{SW}$ | 0 | 0 | 0 | $-I_{SW}R_L$ | 0 | 0 | 1 | 0 | 1 | 1 |
| 1 | 0 | 0 | 0 | $I_{SW}$ | 0 | 0 | 0 | $I_{SW}$ | 0 | 0 | 0 | $-I_{SW}R_L$ | 1 | 1 | 1 | 0 |
| 1 | 0 | 1 | $I_{SW}$ | 0 | $I_{SW}$ | 0 | 0 | 0 | $-I_{SW}R_L$ | 0 | 0 | 0 | 0 | 1 | 1 | 1 |
| 1 | 1 | 0 | 0 | $I_{SW}$ | 0 | 0 | $I_{SW}$ | 0 | 0 | 0 | $-I_{SW}R_L$ | 0 | 1 | 1 | 0 | 1 |
| 1 | 1 | 1 | $I_{SW}$ | 0 | $I_{SW}$ | 0 | 0 | 0 | $-I_{SW}R_L$ | 0 | 0 | 0 | 0 | 1 | 1 | 1 |

Fig. 11a.

| CLASS NO. | CELL USE (BUILDING BLOCKS) | | | INPUT CONNECTIONS | | | | | | | | |
|---|---|---|---|---|---|---|---|---|---|---|---|---|
| | | | | CELL-1 | | | CELL-2 | | | CELL-3 | | |
| | 1 | 2 | 3 | $X_1$ | $Y_1$ | $Z_1$ | $X_2$ | $Y_2$ | $Z_2$ | $X_3$ | $Y_3$ | $Z_3$ |
| 39 | + | ⊕ | + | $\bar{X}_1, \bar{X}_3$ | $\phi$ | $\bar{X}_2, \bar{X}_3$ | $\bar{X}_0, X_1$ | $\bar{X}_0, X_1$ | $\bar{X}_0, X_2, X_3$ | $X_0, X_1, X_2, X_3$ | $\phi$ | $X_0, \bar{X}_1, \bar{X}_2$ |
| 44 | ⊕ | + | | $X_0, X_1$ | $X_0, X_1$ | $X_2, X_3$ | $\bar{X}_0, \bar{X}_1$ | $\phi$ | $X_2, X_3$ | | | |
| 58 | ⊕ | + | + | $X_0, X_2$ | $X_0, X_3$ | $X_1, X_2, \bar{X}_3$ | $\bar{X}_0, \bar{X}_1, X_2$ | $\phi$ | $\bar{X}_0, X_1, \bar{X}_2$ | $\bar{X}_1, \bar{X}_2, X_3$ | $\phi$ | $X_0, X_1, X_2, X_3$ |
| 67 | ⊕ | ⊕ | 1M | $X_0, X_1$ | $X_0, X_1$ | $X_1, X_2, X_3$ | $\bar{X}_0, \bar{X}_1$ | $X_0, \bar{X}_1$ | $\bar{X}_1, X_2, X_3$ | $\bar{X}_2, \bar{X}_3$ | $\phi$ | Logical "1" |
| 71 | ⊕ | ⊕ | + | $X_1, X_3$ | $X_1, X_3$ | $\bar{X}_0, X_1, \bar{X}_2$ | $\bar{X}_0, \bar{X}_1$ | $\bar{X}_0, \bar{X}_1$ | $\bar{X}_1, X_2, X_3$ | $X_1, X_2, X_3$ | $\phi$ | $X_0, X_1, X_2$ |
| 77 | ⊕ | 1M | | $X_2, X_3$ | $X_2, X_3$ | $\bar{X}_0, \bar{X}_1, X_3$ | $X_0, X_1, X_2, X_3$ | $\phi$ | Logical "1" | | | |
| 85 | ⊕ | + | | $X_2, X_3$ | $X_2, X_3$ | $X_0, X_1, X_3$ | $\bar{X}_0, \bar{X}_1, \bar{X}_2; X_3$ | $\phi$ | $X_0, X_1, X_2, \bar{X}_3$ | | | |
| 91 | ⊕ | + | | $X_1, X_3$ | $X_1, X_3$ | $X_0, \bar{X}_2, X_3$ | $\bar{X}_0, X_1, X_2, \bar{X}_3$ | $\phi$ | $X_0, \bar{X}_1, X_2, \bar{X}_3$ | | | |
| 93 | ⊕ | + | | $X_1, X_2$ | $X_1, X_2$ | $\bar{X}_0, X_1, X_3$ | $\bar{X}_0, \bar{X}_1, X_2, X_3$ | $\phi$ | $X_0, \bar{X}_1, \bar{X}_2, X_3$ | | | |
| 99 | ⊕ | + | | $X_2, X_3$ | $X_2, X_3$ | $X_0, \bar{X}_1, X_3$ | $\bar{X}_0, X_1, \bar{X}_2, \ddot{X}_3$ | $\phi$ | $X_0, \bar{X}_1, X_2, \bar{X}_3$ | | | |
| 102 | ⊕ | + | | $\bar{X}_2, X_3$ | $\bar{X}_2, X_3$ | $\bar{X}_0, \bar{X}_1, X_3$ | $\bar{X}_0, X_1, X_2, X_3$ | $\phi$ | $X_0, \bar{X}_1, X_2, \bar{X}_3$ | | | |
| 103 | ⊕ | + | 1M | $\bar{X}_2, \bar{X}_3$ | $\bar{X}_2, \bar{X}_3$ | $X_0, X_1, \bar{X}_2$ | $\bar{X}_0, X_1, X_2$ | $\phi$ | $X_0, \bar{X}_1, X_2$ | $X_1, X_2, \bar{X}_3$ | $\phi$ | Logical "1" |
| 105 | ⊕ | + | + | $\bar{X}_0, \bar{X}_2$ | $\bar{X}_0, \bar{X}_2$ | $\bar{X}_1, \bar{X}_3$ | $\bar{X}_0, \bar{X}_1, X_3$ | $\phi$ | $X_0, \bar{X}_1, \bar{X}_2$ | $X_1, \bar{X}_2, \bar{X}_3$ | $\phi$ | $\bar{X}_0, X_2, \bar{X}_3$ |
| 112 | ⊕ | ⊕ | + | $\bar{X}_2, \bar{X}_3$ | $\bar{X}_2, \bar{X}_3$ | $X_0, X_1, \bar{X}_3$ | $\bar{X}_0, \bar{X}_1$ | $\bar{X}_0, \bar{X}_1$ | $\bar{X}_1, X_2, X_3$ | $X_0, \bar{X}_1, \bar{X}_2, \bar{X}_3$ | $\phi$ | $\bar{X}_0, \bar{X}_1, X_2, \bar{X}_3$ |
| 126 | ⊕ | ⊕ | | $X_1, X_3$ | $X_1, X_3$ | $\bar{X}_0, \bar{X}_2, X_3$ | $X_0, X_2$ | $X_0, X_2$ | $\bar{X}_1, X_2, \bar{X}_3$ | | | |
| 135 | ⊕ | + | | $X_1, X_3$ | $X_1, X_3$ | $X_0, X_1, X_2$ | $X_0, \bar{X}_1, X_3$ | $\phi$ | $\bar{X}_0, \bar{X}_1, X_2, \bar{X}_3$ | | | |
| 136 | ⊕ | + | | $X_1, X_3$ | $X_1, X_3$ | $X_0, X_1, \bar{X}_2$ | $X_0, \bar{X}_1, X_3$ | $\phi$ | $\bar{X}_0, \bar{X}_1, X_2, \bar{X}_3$ | | | |
| 137 | ⊕ | + | 1M | $X_0, \bar{X}_1$ | $X_0, \bar{X}_1$ | $\bar{X}_0, X_2, X_3$ | $\bar{X}_2, \bar{X}_3$ | $\phi$ | $X_0, X_1, \bar{X}_3$ | $X_0, \bar{X}_1, X_2, X_3$ | $\phi$ | Logical "1" |

Fig. 11b.

| | | | | | | | | | | | | |
|---|---|---|---|---|---|---|---|---|---|---|---|---|
| 139 | $\oplus$ | + | | $\bar{x}_2, x_3$ | $\bar{x}_2, x_3$ | $x_0, x_1, x_3$ | $x_1, x_2, \bar{x}_3$ | $\phi$ | $x_0, \bar{x}_1, x_2, \bar{x}_3$ | | | |
| 141 | $\oplus$ | + | | $\bar{x}_2, x_3$ | $\bar{x}_2, x_3$ | $\bar{x}_0, \bar{x}_1, x_3$ | $x_1, x_2, \bar{x}_3$ | $\phi$ | $x_0, \bar{x}_1, x_2, \bar{x}_3$ | | | |
| 143 | $\oplus$ | + | | $x_0, x_1$ | $x_0, x_1$ | $x_1, x_2, \bar{x}_3$ | $\bar{x}_0, \bar{x}_1, x_2$ | $\phi$ | $x_0, \bar{x}_1, x_2, \bar{x}_3$ | | | |
| 144 | $\oplus$ | $\oplus$ | | $\bar{x}_0, x_3$ | $\bar{x}_0, x_3$ | $\bar{x}_1, \bar{x}_2$ | $x_0, \bar{x}_3$ | $x_0, \bar{x}_3$ | $x_1, x_2, \bar{x}_3$ | | | |
| 145 | $\oplus$ | $\oplus$ | 1M | $\bar{x}_0, x_1$ | $\bar{x}_0, x_1$ | $x_1, x_2, x_3$ | $x_0, \bar{x}_1$ | $x_0, \bar{x}_1$ | $\bar{x}_1, x_2, x_3$ | $\bar{x}_0, \bar{x}_2, \bar{x}_3$ | $\phi$ | Logical "1" |
| 155 | $\oplus$ | + | | $x_2, x_3$ | $x_2, x_3$ | $\bar{x}_0, x_1, x_3$ | $x_1, x_2, \bar{x}_3$ | $\phi$ | $x_0, \bar{x}_1, \bar{x}_2, x_3$ | | | |
| 157 | $\oplus$ | + | | $\bar{x}_2, x_3$ | $\bar{x}_2, x_3$ | $\bar{x}_0, x_1, x_3$ | $x_1, x_2, \bar{x}_3$ | $\phi$ | $x_0, \bar{x}_1, \bar{x}_2, x_3$ | | | |
| 158 | $\oplus$ | + | | $\bar{x}_2, x_3$ | $\bar{x}_2, x_3$ | $x_0, \bar{x}_1, x_3$ | $x_0, x_1, x_2$ | $\phi$ | $\bar{x}_0, \bar{x}_1, x_2, \bar{x}_3$ | | | |
| 159 | + | + | 1M | $\bar{x}_0, \bar{x}_1, \bar{x}_2$ | $\phi$ | $x_0, x_1, x_3$ | $x_1, x_2, x_3$ | $\phi$ | $x_0, x_1, x_2$ | $x_0, x_2, x_3$ | $\phi$ | Logical "1" |
| 161 | $\oplus$ | + | | $x_2, x_3$ | $x_2, x_3$ | $\bar{x}_0, \bar{x}_1, x_3$ | $x_0, x_1, \bar{x}_2$ | $\phi$ | $\bar{x}_0, \bar{x}_1, x_2, \bar{x}_3$ | | | |
| 163 | $\oplus$ | + | | $x_0, x_3$ | $x_0, x_3$ | $\bar{x}_1, x_2, x_3$ | $x_0, x_1, \bar{x}_2, \bar{x}_3$ | $\phi$ | $\bar{x}_0, \bar{x}_1, x_2, \bar{x}_3$ | | | |
| 164 | $\oplus$ | + | | $x_0, x_3$ | $x_0, x_3$ | $x_1, x_2, x_3$ | $x_1, x_2, \bar{x}_3$ | $\phi$ | $\bar{x}_0, \bar{x}_1, \bar{x}_2, \bar{x}_3$ | | | |
| 168 | | | | SPECIAL CASE AS EXPLAINED IN TEXT | | | | | | | | |
| 168 | | | | | | | | | | | | |
| 173 | $\oplus$ | + | 1M | $\bar{x}_2, \bar{x}_3$ | $\bar{x}_2, \bar{x}_3$ | $x_0, x_1, \bar{x}_3$ | $\bar{x}_0, \bar{x}_1, x_2$ | $\phi$ | $\bar{x}_0, x_1, \bar{x}_2$ | $x_0, \bar{x}_1, \bar{x}_2$ | $\phi$ | Logical "1" |
| 175 | + | + | 1M | $x_1, \bar{x}_2, x_3$ | $\phi$ | $x_1, x_2, \bar{x}_3$ | $\bar{x}_0, x_2, x_3$ | $\phi$ | $\bar{x}_1, x_2, x_3$ | $x_0, \bar{x}_1, \bar{x}_2, \bar{x}_3$ | $\phi$ | Logical "1" |
| 176 | $\oplus$ | + | + | $x_2, x_3$ | $x_2, x_3$ | $\bar{x}_0, x_1, x_2$ | $\bar{x}_0, \bar{x}_1, x_2, x_3$ | $\phi$ | $\bar{x}_0, x_1, \bar{x}_2, x_3$ | $x_0, \bar{x}_1, \bar{x}_2, x_3$ | $\phi$ | $x_0, \bar{x}_1, x_2, \bar{x}_3$ |
| 180 | + | $\oplus$ | | $\bar{x}_0, x_1, x_3$ | $\phi$ | $x_0, x_1, \bar{x}_3$ | $\bar{x}_1, x_3$ | $x_1, x_3$ | $\bar{x}_0, \bar{x}_1, x_2$ | | | |
| 181 | $\oplus$ | + | + | $\bar{x}_2, x_3$ | $\bar{x}_2, x_3$ | $x_0, x_1, x_3$ | $\bar{x}_0, \bar{x}_1, x_2, x_3$ | $\phi$ | $x_0, x_1, \bar{x}_2, \bar{x}_3$ | $\bar{x}_0, \bar{x}_1, x_2, x_3$ | $\phi$ | $x_0, \bar{x}_1, x_2, \bar{x}_3$ |
| 184 | $\oplus$ | $\oplus$ | | $\bar{x}_1, \bar{x}_2$ | $\bar{x}_1, \bar{x}_2$ | $x_0, \bar{x}_2, x_3$ | $x_1, \bar{x}_3$ | $x_1, \bar{x}_3$ | $\bar{x}_0, x_2, \bar{x}_3$ | | | |
| 189 | $\oplus$ | $\oplus$ | | $x_1, x_3$ | $x_1, x_3$ | $\bar{x}_0, x_1, x_2$ | $\bar{x}_1, x_3$ | $\bar{x}_1, x_3$ | $x_0, \bar{x}_1, x_2$ | | | |

Fig. 11c.

| | | | | | | | | | | | | |
|---|---|---|---|---|---|---|---|---|---|---|---|---|
| 190 | ⊕ | ⊕ | | $\bar{X}_2, X_3$ | $\bar{X}_2, X_3$ | $X_0, X_1, \bar{X}_2$ | $X_2, X_3$ | $X_2, X_3$ | $\bar{X}_0, \bar{X}_1, X_2$ | | | |
| 192 | ⊕ | ⊕ | | $\bar{X}_2, X_3$ | $\bar{X}_2, X_3$ | $X_0, X_1, \bar{X}_2$ | $X_2, \bar{X}_3$ | $X_2, \bar{X}_3$ | $\bar{X}_0, \bar{X}_1, X_2$ | | | |
| 194 | ⊕ | ⊕ | | $\bar{X}_2, X_3$ | $\bar{X}_2, X_3$ | $X_0, X_1, \bar{X}_2$ | $X_2, \bar{X}_3$ | $X_2, \bar{X}_3$ | $X_0, X_1, X_2$ | | | |
| 203 | ⊕ | ⊕ | | $X_1, \bar{X}_3$ | $X_1, \bar{X}_3$ | $\bar{X}_0, X_2, \bar{X}_3$ | $\bar{X}_1, \bar{X}_2$ | $\bar{X}_1, \bar{X}_2$ | $X_0, \bar{X}_1, X_3$ | | | |
| 206 | ⊕ | ⊕ | | $X_1, X_3$ | $X_1, X_3$ | $X_0, X_1, X_2$ | $\bar{X}_0, \bar{X}_1, X_2$ | $\phi$ | $X_0, \bar{X}_1, X_3$ | | | |
| 209 | ⊕ | + | 1M | $X_1, X_3$ | $X_1, X_3$ | $\bar{X}_0, X_2, X_3$ | $X_0, \bar{X}_2, X_3$ | $\phi$ | $X_1, X_2, \bar{X}_3$ | $X_0, X_2, \bar{X}_3$ | $\phi$ | Logical "1" |
| 213 | ⊕ | ⊕ | | $\bar{X}_0, X_1, \bar{X}_2$ | $\bar{X}_0, X_1, \bar{X}_2$ | $\bar{X}_0, \bar{X}_1, \bar{X}_3$ | $X_0, \bar{X}_1$ | $X_0, \bar{X}_1$ | $X_0, X_2, \bar{X}_3$ | | | |
| 217 | ⊕ | ⊕ | | $\bar{X}_2, X_3$ | $\bar{X}_2, X_3$ | $X_0, X_1, X_3$ | $X_2, \bar{X}_3$ | $X_2, \bar{X}_3$ | $\bar{X}_0, \bar{X}_1, X_2$ | | | |
| 218 | ⊕ | + | 1M | $X_0, X_1$ | $X_0, X_1$ | $X_1, \bar{X}_2, \bar{X}_3$ | $\bar{X}_0, \bar{X}_1, \bar{X}_3$ | $\phi$ | $\bar{X}_0, \bar{X}_1, \bar{X}_3$ | $\bar{X}_1, \bar{X}_2, \bar{X}_3$ | $\phi$ | Logical "1" |
| 219 | ⊕ | ⊕ | | $X_1, X_2$ | $X_1, X_2$ | $\bar{X}_0, X_1, \bar{X}_3$ | $\bar{X}_1, X_3$ | $\bar{X}_1, X_3$ | $X_0, \bar{X}_1, X_2$ | | | |
| 220 | ⊕ | ⊕ | | $\bar{X}_0, X_3$ | $\bar{X}_0, X_3$ | $\bar{X}_0, X_1, X_2$ | $X_0, X_2$ | $X_0, X_2$ | $X_0, X_1, \bar{X}_3$ | | | |
| 221 | ⊕ | ⊕ | | $\bar{X}_2, X_3$ | $\bar{X}_2, X_3$ | $X_0, \bar{X}_1, X_3$ | $\bar{X}_0, \bar{X}_1, X_2$ | $\bar{X}_0, \bar{X}_1, X_2$ | $X_0, X_1, \bar{X}_3$ | | | |
| 222 | ⊕ | ⊕ | | $\bar{X}_1, \bar{X}_2$ | $\bar{X}_1, \bar{X}_2$ | $\bar{X}_0, X_1, \bar{X}_3$ | $\bar{X}_0, \bar{X}_1, \bar{X}_3$ | $\bar{X}_0, \bar{X}_1, \bar{X}_3$ | $X_0, \bar{X}_1, \bar{X}_2$ | | | |

UNIVERSAL LOGIC GATE

FIELD OF THE INVENTION

This invention generally relates to cascode circuits and in particular this invention relates to the interconnection and combination of four input, two level, modular, emitter coupled logic cascode circuits for use as universal logic gates for performing all four input logic functions as well as many functions of more than four variables, all in a gate delay equivalent to that of comparable emitter coupled logic gate.

DESCRIPTION OF THE PRIOR ART

Universal logic gates utilizing cascode cells and load cells for synthesizing various four input logic functions of the type herein disclosed are not known in the prior art. Special purpose cascode emitter coupled logic circuits however, are generally known in the prior art in the computer logic circuit design field although differing from this particular type in that they are arranged to perform only one or a small class of functions such as a two input EXCLUSIVE-OR function. The term universal logic gate (ULG) refers to a basic logic circuit capable of performing a number of logic synthesis operations or compositions of logic functions merely by the making of small circuit or programming changes to the basic unit so that it can perform all logic functions of some specified integral number of input variables, such as for example four input variables.

Devices such as AND, OR, NOR, and NAND gates for performing logic functions are well known in the prior art. Arrays of these gates have been combined into modular units for use as universal logic gates (ULGs), of sorts, whereby various logic functions may be generated merely by selective interconnection of the individual gates and/or by selective programming. Some of these gate arrays have been used for the one gating stage delay synthesis of three input logic functions and several of these modular units may be combined to perform some or a limited number four input logic functions in one gating stage delay. In general however, multi-gating stages networks are required to implement all the functions of four inputs.

One type of prior art three input ULG uses a (TTL) NAND gate network and includes an inverter, for generating a function and its complement. This ULG includes several NAND gates which generate the function and an inverter is used for producing the complement of the function. This ULG produces all three input logic functions merely by selective biasing to logical one or zero signal level and/or interconnection of the programming terminals and the input terminals, respectively. Ten NAND gates in this three input ULG are arranged in seven stages which result in a substantial time delay in processing a signal.

Still another version of a three input ULG, developed by Yau and Tang, comprises seven OR-gates and an inverter or NOR-gate arranged in three stages. This ULG synthesizes all three input logic functions by programming the three programming pins using duplication of inputs and an inverter. This ULG produces only uncomplemented outputs and requires only uncomplemented inputs.

A four input ULG has also been developed by Yau and Tang which utilizes twelve OR-gates arranged in three stages plus an inverter. This ULG requires seven programming pins wherein programming is accomplished by duplication of inputs to the programming pins and use an external inverter. The number of programming pins may be reduced to two by using series-connected shift registers in place of individual programming pins. The two programming pins remaining are for controlling the shift registers and for inputting the data, respectively.

These ULGs have several drawbacks in common which include high power requirements, relatively long propagation delay from input to output, a high power-delay product, and substantial substrate area required in integrated circuit applictions. The area of silicon substrate required for making a ULG is determined logically by the number of gates within it and the number of components such as transistors, resistors and alike within each gate. All of the above-mentioned ULGs require several gating stages and several gates per stage. Since, relatively speaking, many gates are required for each ULG, the power requirements are high since all the gates must be supplied power whether needed or not. An additional drawback of the above-described ULGs is that the entire ULG is not modular. In other words, if a particular gate or stage in a given ULG is not being utilized it is not available for interconnection into another ULG.

R. M. Gascoigne in an article entitled "Logic Circuit Can Realize Any Boolean Function of Three Variables" published in the British publication Electronic Engineering, November 1970, discloses a type of ULG utilizing a cascode circuit. It is claimed that this particular ULG can implement all the functions of three input variables. The Gascoigne circuit cannot be used as a module in the realization of a single stage four input universal logic gate having a unit time delay. It can, however, implement several, albeit a small fraction, of the four input logic functions when programming inputs to the circuit or converted to signal inputs. In general most four input functions cannot be realized by one Gascoigne ULG circuit or any parallel connection of several ULGs since this circuit cannot generate the AND function of four input variables.

The emitter coupled logic (ECL) has the highest speed capabilities of all logic gates because transistors are employed in such a manner that they always operate in an unsaturated state. One standard emitter coupled logic (ECL) circuit is also referred to as a current switch emitter follower (CSEF) circuit. A CSEF logic gate functions as an OR-gate and a NOR-gate. Such an ECL gate thereby provides an output of the function f and also the complement of the function i.e. $\bar{f}$. All three input logic functions may be generated by up to four such CSEF gates in parallel when their NOR outputs are wire-OR connected. The various functions are synthesized by selective interconnection of the several ECL gates. A commercially available three input ECL ULG utilizes four separate three input ECL NOR/OR circuits. The NOR outputs are "wire-ORed" together and the OR-side collectors, normally fed to separate emitter followers are instead, "wire-ANDed" together and drive a single output emitter follower. This particular ULG dissipates about 100 milliwatts of power with no inputs or outputs connected. The time delay of the circuit is approximately 2.5 nanoseconds for producing both the function and its complement simultaneously.

SUMMARY OF THE INVENTION

Accordingly, it is an object of the present invention to provide a universal logic gate applicable for synthesizing all three and four input logic functions and some five and six input logic functions as well.

It is another object of the present invention to provide a universal logic gate having a unit time delay comparable to the delay of most current switch emitter follower gates.

It is another object of the present invention to provide a ULG requiring substantially less power while realizing three and four input functions than any other ECL or comparable gating circuits designed to operate in the same speed regimes.

It is still another object of the present invention to provide a ULG having a very significantly improved power-delay product.

It is yet another object of the present invention to provide a ULG having a minimum number of stages and a minimum number of gating levels.

It is still another object of the present invention to provide a modular ULG capable of synthesizing all three and four input logic functions and their complements simultaneously with no additional attendant costs.

In accordance with the foregoing objects, a modular ULG includes a plurality of cascode cells and a plurality of load cells, wherein each cascode cell provides series gating between upper and lower level current switches. Signal input terminals to the upper level current switch section of the cascode cell are provided by dual quad-transistors while a single quad-transistor provides an input to the lower level current switch. The upper level current switch section has four collector nodes which provide four current paths. Central in the composition of the ULG are the specific provisions made therein permitting inter and intra cascode circuit collector nodecollector node to load cell input connections, load cell output to load cell output connections, and connections from a set of ULG functional inputs to various selected cascode circuit inputs. These provisions permit programming, i.e., selection of the function or class of functions performed by the ULG wherein, selected ones of the collector nodes may be wire-"ANDed" together and coupled to individual load cells for forming a "bussed EXCLUSIVE OR"-gate and providing a function and its complement. Alternatively, an individual collector node may be coupled to an individual load cell while selected other nodes are wire-"ANDed" together and coupled to another load cell thereby providing a "bussed OR-gate" having an output function and its complement. Moreover, a plurality of cascode cells may be used in combination with a plurality of load cells wherein the load cell outputs may be wire-"ORed" together for providing the OR of the outputs of a plurality of cascode cells. Thru a utilization of these programming techniques and by selective interconnection of cascode circuit inputs of functional input signals a plurality of cascode cells and a plurality of load cells may be utilized for synthesizing all four variable logic functions along with their complements in a unit time delay and a minimum power-delay product. Other multi-variable input functions may also be synthersized.

BRIEF DESCRIPTION OF THE DRAWINGS

FIG. 2 is a table illustrating the voltages and currents of a cascode cell/load cell combination.

FIGS. 11*a*, 11*b* and 11*c* are tables of multi-cascode cell configuration for synthesizing fifty classes of logic functions.

DETAILED DESCRIPTION OF THE DRAWINGS

Figure 1A:
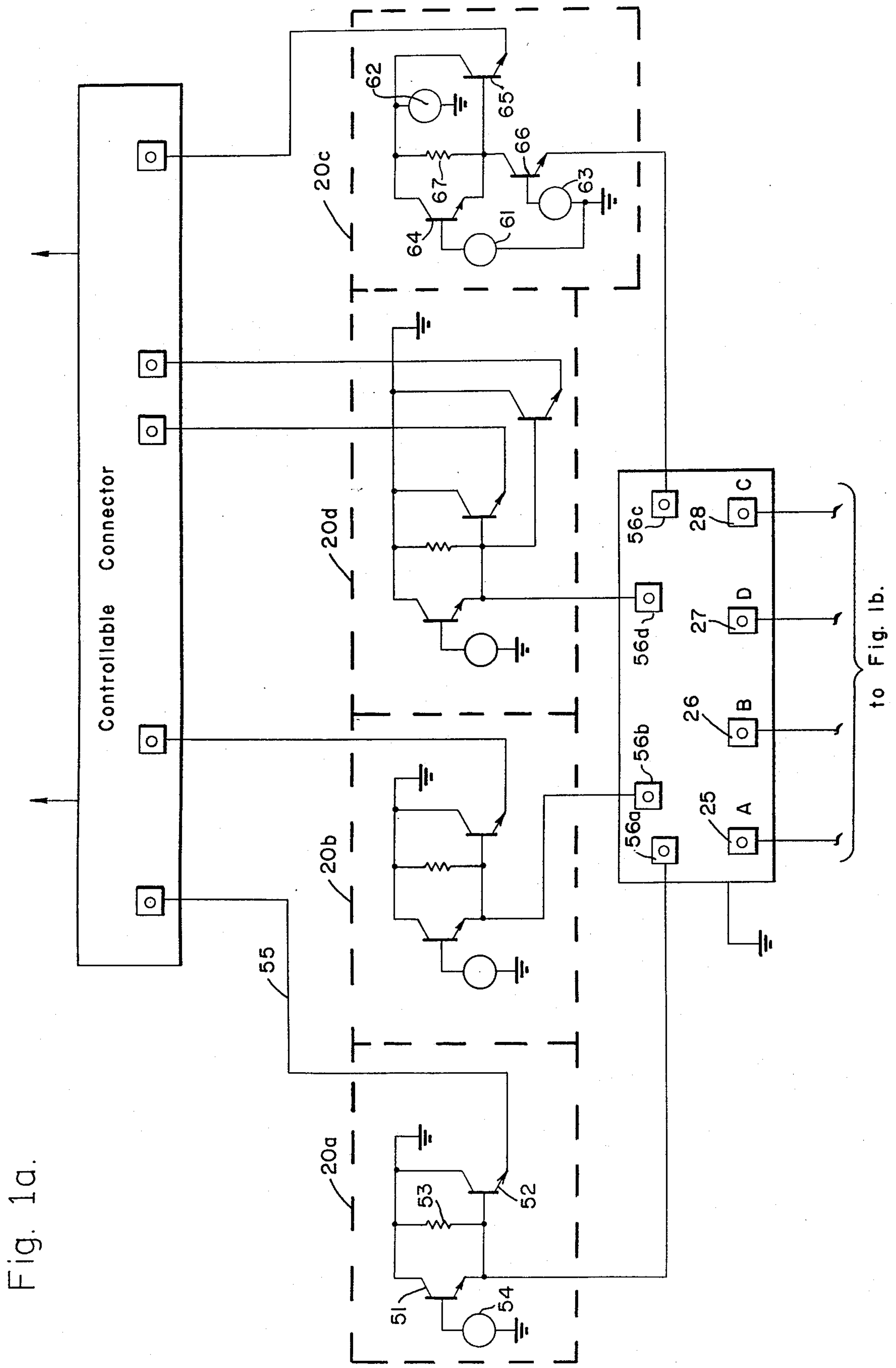
FIGS. 1*a* and 1*b* are schematic diagrams showing a cascode current switch and load cells according to the invention.

Referring to FIG. 1, a three input universal logic unit which for convenience of description will be called a universal logic gate (ULG) is shown which includes a cascode current switch cell 10 and a plurality of load cells 20 indicated as 20*a*, 20*b*, 20*c* and 20*d* which may be selectively connected by programming, for example, to collectors of the cascode cell 10. It is to be understood that the unit shown in FIG. 1 although called a ULG is diagrammed there in a manner facilitating description of its cascode cell and load components and their operation and that these component cascode circuit and load cells comprise building blocks for forming a ULG of two, three and four or more input variables. The cascode current switch cell 10 includes an upper current switch section 11 having four current paths, a lower current switch section 45 having two main current paths, current source circuitry 14 voltage reference circuits 17. The current source circuitry 14 includes a level shift current source 15 and a switch current source 16. The reference voltage circuit 17 includes first and second voltage sources 18 and 19. The voltage reference sources 17 may be implemented outside the cascode cell 10. Two of the upper level current paths 12*a* and 12*b* are coupled to a first main current path 12 and the other two upper level current paths 13*c* and 13*d* are coupled to a second main current path 13.

The upper level current switches 11 include switching means illustrated here as a pair of common-base connected transistors 22 and 23, which are illustrated as NPN types but which may be of other types such as PNP transistors. Transistors 22 and 23 control the flow of current in current paths 12 and 13. The bases of transistors 22 and 23 are coupled to the first reference voltage source 18, which may be nominally −1.3 volts. Switching means shown here as a quad transistor 21 is connected to transistor 22 for controlling the current. The emitters of a quad or multi-base transistor 21 are coupled together and also coupled to the emitter of the transistor 22. Transistor 21 is for controlling current flow through current paths 12*a* and 12*b*. The quad or multi-base transistor 21 in the illustrated circuit is a transistor structure having a common connected emitters and a common collector and individual bases. Alternatively, the transistor 21 may be four transistors of a selected type with their emitters coupled together and their collectors coupled together. The bases of the quad-transistor 21 provide X-input terminals to the upper level current switch 11, the X-input terminals to the upper level current switch 11, being designated as $x_0, x_1, x_2, x_3$. The quad-transistor 21 thereby provides an OR-gate input to the upper level current switch 11. Input signals to these X terminals may be either a logical 1 or 0 and the logical 1 input signal may be nominally −0.9 volt while the logical 0 may be −1.7 volts, for example. Pull-down resistors 29–32, are respectively coupled between the individual bases of the quad-transistor 21 and a negative voltage supply $V_{EE}$ which may be any suitable supply providing −5.2 volts for example. Alternatively, the pull-down resistors 29–32 may be coupled to any supply voltage more negative than the logical zero signal voltage. If a logical 1 signal is applied to the quad-transistor 21 via any of the X-input terminals, current may flow in the current path 12*a* if other conditions are satisfied, which conditions will be discussed below. Switching means shown here as a quad transistor 24 is connected to transistor 23 for controlling the flow of current through current paths 13*c* and 13*d*. The second quad-transistor 24 and the transistor 23 are emitter-coupled together, and this second quad-transistor 24 may be identical to the first quad-transistor 21. The individual bases of the transistor 24 provides the Y-input terminals to the upper level current switch 11, wich terminals are designated as $y_0, y_1, y_2$ and $y_3$. The transistor 24 thereby provides an OR-gate input to the upper level current switch 11, similar to the other logical input terminals of the upper current switch 11. The input signals provided to these Y-input terminals are either logical 1 or 0 states. Pull-down resistors 33–36 are respectively coupled between the individual bases of the quad-transistor 24 and a negative voltage, such as $V_{EE}$. If a logical 1 signal is applied to the quad-transistor 24 via any of the Y-input terminals, current may flow in the current path 13*c* if certain conditions are satisfied, which conditions are described below. The transistors 21–24 each provide respective branches of the upper level current switch 12*a*, 12*b*, 13*d* and 13*c*. The collectors of the four transistors 21–24 are coupled to four collector current node terminals 25–28, respectively. Included in the ULG is a controllable means or provision permitting all the various differing appropriate connections between load cells described below and collector terminals of one or a plurality of cascode circuits thereby in part accomplishing programming of the logical operation of the network formed as the cascode circuits and load cells are connected in a manner described more fully below.

The lower level currennt switch 45 includes switching means having a quad transistor 38 and a matched pair of emitter-coupled transistors 38 and 39 for switching the current flow between the main branches 12 and 13. The collector of transistor 38 is connected to the emitters of the upper level transistors 21 and 22 for providing the first main current path 12. The collector of the transistor 38 is connected to the emitters of the upper level current switch transistors 23 and 24 for providing the second main current path 13. The emitters of transistors 38 and 39 are coupled to the switched current source 16. The base of transistor 39 is coupled to the reference voltage source 19 which may provide for example, a nominal −2.9 volts at that base. The common emitter connection of a quad-transistor 37, similar to the above-mentioned quad-transistors 21 and 24, is coupled to the base of the transistor 38 through any of a variety of well known level shifting circuits such as a diode 40. The base of transistor 38 is also coupled to the level shift current source 15. The diode 40 or any other appropriate circuit produces a negative level shift between the emitters of transistors 37 and the base of the transistor 38 in order that the transistor 38 determines the branch in which the switch current $I_{sw}$ flows. The common collector junction of the quad-transistor 37 is coupled to ground or any other appropriate power supply voltage. The individual bases of the quad-transistor 37 provide the Z-input terminals to the lower level current switch transistors 38 and 39, which terminals are designated $z_0, z_1, z_2$ and $z_3$. Pull-down resistors 41–44 are respectively coupled between the individual bases of the quad-transistor 37 and the supply voltage such as $V_{EE}$. An input signal having a logical state of 1 applied to any of the Z-inputs results in the switch current $I_{sw}$ flowing in the first main current branch 12. Thus, the quad-transistor provides an OR-gate input to the lower level current switch.

The ULG includes another controllable interconnection means or provision permitting all the various differing appropriate connections between the *x*-input, *Y*-input and *Z*-input terminals of one cascode circuit and between these terminals and other *X*, *Y*, and *Z* input terminals of a plurality of cascode circuits and also between appropriate and selected ones of the ensemble of these terminals and a designated set of ULG input terminals in a manner described more fully below to accomplish in part programming of the overall network's logical operation. Provision is also included for connecting to various and selected appropriated terminals in this ensemble of cascode circuit input terminals, the outputs of one or more load cells thereby biasing these inputs at a constant logical 1 input signal in a manner more fully described below, also accomplishing in part programming of the network's logical operation.

The load cell 20a includes an emitter follower transistor 52 and clamp circuitry, possibly including another emitter follower transistor 51 wherein for example, the emitter of transistor 51 is coupled to the base of the transistor 52 and to one end of the load resistor 53. The other end of the resistor 53 and the collectors of the transistors 51 and 52 are returned to ground level or to any appropriate $V_{CC}$ supply voltage. A voltage reference 54 is coupled to the base of the transistor 51. The clamp circuit regardless of how it is implemented, serves to maintain a proper low or logic-zero level signal at the emitter of transistor 52 when more than one switch current is fed thru resistor 53 and also to prevent saturation of transistors in the upper current switch sections e.g. 21–24. The emitter of the transistor 52 is coupled to the output terminal 55.

The load cells 20b, 20c and 20d may be identical to the load cell 20a and need not be further described. The load cells may be coupled to predetermined collector current nodes 25–28 depending on the particular logic function being implemented.

Still another controllable interconnection means is included in the ULG providing for all appropriate differing connections between load cell outputs and the outputs of other load cells to accomplish in part ULG programming in a manner described below.

It is to be noted that in load cell 20d, representative of one or several load cells, provisions are made for two or more emitter followers whose bases are connected to the lower end of the load resistor, that node also being common to the cell input. These multiple emitter followers permit duplication of circuit outputs so that some may be wire-ORed to the outputs of other load cells forming new composite functions, while other emitter followers in the original load cell not so connected preserve the original function for application to the inputs of other circuits. Depending on the requirements, any combination of single and multiple emitter followers may be utilized for the load cells in accordance with the invention.

It is also to be noted that in load cell 20c, representative of one or several load cells, provision is made for common base decoupling. This decoupling is accomplished by the incorporation of a "common base" transistor 66, whose base is connected to a constant (ac ground) level voltage shown supplied by voltage source 63, whose emitter is available to the lower controllable connector, and whose collector is connected to the point common to the emitter of clamp transistor 64, load resistor 67, and the base of the output emitter follower 65. The clamp reference voltage source 61, load resistor 67, output emitter follower 65, and $V_{CC}$ supply voltage source 62, remain functionally equivalent to their counterparts in for example load cell 29a. The values of $V_{CC}$ and the clamp reference voltage may differ however from those suggested earlier as necessary to preserve nominal overall circuit operation. Alternatively changes in internal reference levels might be made relative to the cascode current switch circuit.

The circuit propagation delay when load cells without common base decoding are used through the various different ULG configurations discussed more fully below, can be expressed as

| | | |
|---|---|---|
| $t_{pd} =$ | = | $t_{pdo} + t_{pdLC} + .7R_L(N_QC_Q + N_SC_S)$ where |
| $t_{pdo}$ | = | the delay through the cascode current switch, |
| $t_{pdLC}$ | = | the delay through the emitter follower plus the delay due to the parasitic capacitances in the load cell alone that are impressed across the load resistor, |
| $R_L$ | = | load resistance |
| $C_Q$ | = | equivalent capacitance impressed across the load resistor when one multi-base or quad-transistor's collector is connected |
| $N_Q$ | = | number of such collectors connected to a load cell input |
| $C_S$ | = | equivalent capacitance impressed across the load resistor when one single transistor is connected |
| $N_S$ | = | number of such collectors connected. |

In the various different ULG configurations, the number of single and quad collectors connected to any load cell input is relatively small for implementation of all four input logic functions. Consequently overall ULG delay remains comparable to that for conventional ECL circuits which may also utilize specific fixed internal collector wire-AND circuitry. If logic functions of a greater number of variables are implemented however by increasing the fan-in of the wired-AND gate implicitly formed at the collector node common to the several collectors, then overall delay would also substantially increase.

When load cells incorporating the common base decoupling technique are used though, the impedance "seen" by the collector node(s) of the cascode current switch(es) connected at the load cell's input is dramatically reduced from $R_L$ to a resistance at least an order of magnitude smaller. Consequently overall circuit delay is similarly reduced and remains nearly constant as the number of collectors connected together is allowed to increase e.g. to 10 or 15.

The above-mentioned transistors may be npn or pnp and are not limited to bipolar but also FET's and triple diffused transistors may be equally applicable. Any other three terminal device such as Josephson devices, Gunn devices, magnetic or magnetic bubble circuits having transfer characteristics similar to those of transistors may also be utilized. In the above description and following, circuit operation, logic levels, supply and reference voltage levels, have been specified only for purposes of clarification. More generally different but appropriate voltages would be used as determined by the nature of the devices employed and etc. in a manner well understood by those versed in the art of circuit design.

Figure 1B:
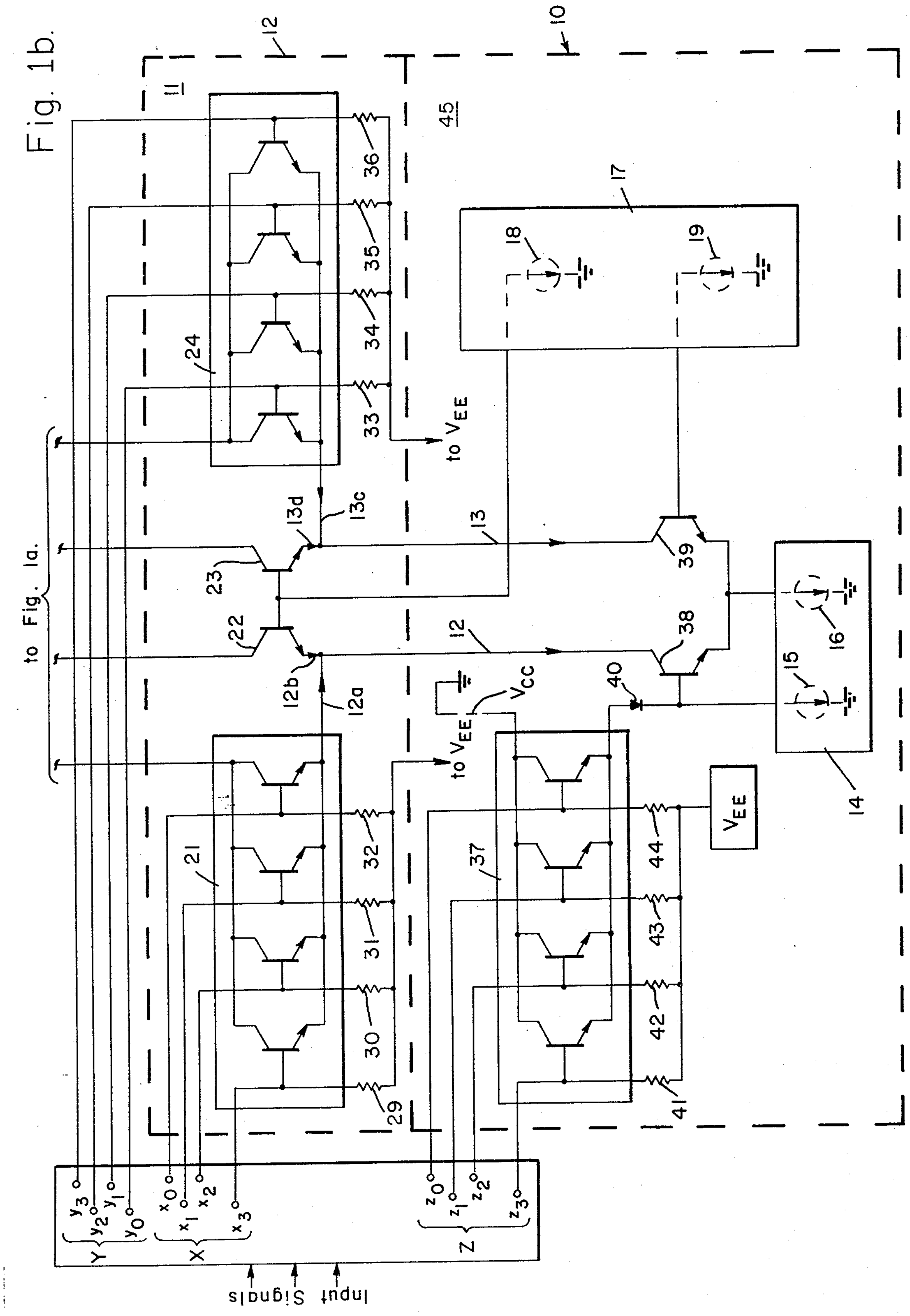

The basic operation of the cascode cell-load cell configuration will now be described with reference to FIGS. 1a, 1b. FIG. 2 is a table illustrating the voltage input states to the X, Y and Z input terminals, the collector currents of the lower level transistors 38 and 39, the collector currents and voltages of the upper level transistors 21–24, as well as the output states at the load cells 20a, *b*, *c* and *d*. For purposes of discussion it is considered that each respective collector current node 25–28 is coupled to a terminal 56 of a different individual load cell 20a, 20b, 20c, and 20d. A logical 1 or "true" state is a high voltage of −0.9 volt while a logical 0 or "false" state is a low voltage of −1.7 volts, in the illustrative example. The switch current $I_{sw}$ of approximately 4 milliamperes will flow in only one of the four upper level current branches 12*a*, 12*b*, 13*c* or 13*d* at any one time, depending on X, Y and Z input states thereby causing a 0.8 volt drop across just one of the load resistors such as 53 (shown) in one of the load cells. The switch current then flows through either of the two main lower level current branches 12 or 13, depending on the Z input state. For example, with the proper input signals to the various X, Y and Z input terminals, the switch current $I_{sw}$ will flow from the first load cell 20*a* through the collector terminal 25 along current path 12*a* and down the main current path 12 to the switch current source 16.

Initially, of only low logic level signals are provided to all X, Y and Z input terminals, the cascode cell is in a quiescent state and the switch current $I_{sw}$ flows from the load cell 20*d* connected to the collector node 27 or D. Similarly if no inputs are connected, under these implicit logical zero input bias conditions, the switch current flows through the load resistor 53 in the load cell dropping the voltage at the output terminal 55 to −1.7 volts which is a "false" or "logical-0" state. The current flows down the current path marked 13*d* into the main current path 13 and into the current source 16. A logic state of 1 is provided by the load cells 20*a*–20*c*.

If a logical 1 or true input signal is provided to any one or more than one of the Z input terminals $z_0$, $z_1$, $z_2$, or $z_3$, all formerly not connected, then the transistor element or elements of the quad-transistor 37 conduct, thereby forward-biasing the diode 40 or equivalent level shift circuit causing the transistor 38 to conduct. Alternatively, of one or more Z inputs are connected but with its signal level initially in a logical zero state and if it subsequently shifts to a high or "one" state, then the same current transfer occurs but here the diode and input transistor remain in conduction before and after the transition. Since the emitter of the transistor 38 is at a higher voltage level than that of transistor 39, the current flow in the main current branch 13 ceases and the switch current $I_{sw}$ now flows in the main current path 12. The current therefore flows from the load cell 20*b* down the current path 12*b* and into the main current path 12. This current flow provides a logical "false" or "zero" output signal at the load cell 20*b* and logical "true" or "one" signals at the other load cell outputs. It is noted that so long as there is a logical true input signal at any of the Z input terminals, current will flow only in the main current path 12 regardless of any high level input to the Y-input terminals, since the logical input state to the Z terminals dominates.

If there is a logical 1 or "true" signal applied to both the X and Z-input terminals, then current will flow along the upper current path 12*a* and the main current path 12. A high signal to any of the X-input terminals causes the quad-transistor 21 to conduct the switch current $I_{sw}$ from the load cell 20*a*, through the collector node 25 along 12*a* and into the main current path 12. This provides the load cell 20*a* with a logical 0 output or −1.7 volts.

If logic 1 or "true" signal is applied to any of the Y input terminals and no logic 1 state is applied to any of the Z-input terminals, the switch current $I_{sw}$ flows along the current path 13*c* into the main current path 13. The logic "true" signal applied to the Y terminal places the quad-transistor 24 into conduction so that the collector node 28 conducts current from the load cell 20*c*. The output voltage of the load cell 20*c* is therefore a logic "false" or −1.7 volts. The other output voltages are "true" since there is no current flowing in the other branches. It is noted that since the switch current $I_{sw}$ is flowing in the second main current path 13, any "true" input signal to the X-input terminal is ineffective to make the switch current flow in the first main branch 12.

Thus, if a "true" signal is applied to any of the Z-input terminals, current will flow only in the main current path 12 regardless of any input signals to the Y-input terminals. If no "true" signals are applied to the Z-input terminals, current will only flow in the main current path 13 regardless of any input signals to the X-input terminals.

Figure 3A:
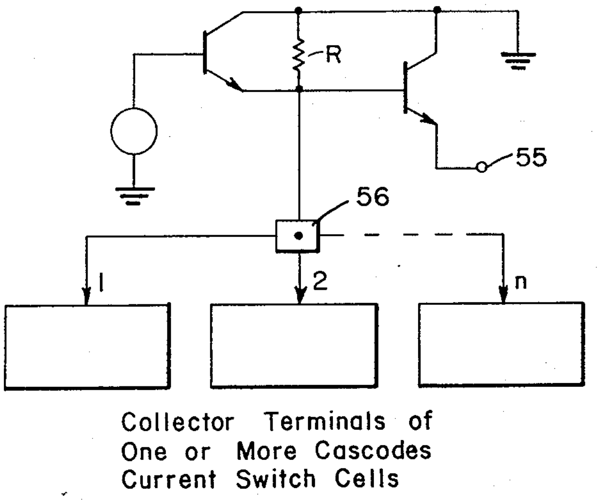
FIGS. 3*a* and 3*b* are schematic diagrams depicting the "implicit-AND" and "wired-AND" connection of a cascode cell and a load cell.

A "wired-AND" or "implicit-AND" gating connection will now be described with reference to FIG. 3. In FIG. 3*a* a load cell 20 is shown having the terminal 56 coupled to a plurality of collector node terminals. These collector terminals may belong to the same cascode cell or to different cascode cells. Approximately only one switch current may flow through the load resistor R in the load cell if connected to more than one cascode switch, and if more than one is drawing $I_{sw}$, then the clamp circuit will absorb all but about one switch current. Depending on the input states of the X, Y and Z terminals, a switch current will flow through only one of the collector node terminals at each connected cascode cell. The load cell will have a "true" or 1 output state so long as no current flows from any of the collector node terminals connected to the load cell 20. If, however, there is a switch current $I_{sw}$ flowing in any one or more of the current paths connected to collector nodes then there will be a 0 or "false" output at the load cell that is conducting. This connection provides "implicit-AND" or "wired-AND" gating capability.

Figure 3B:
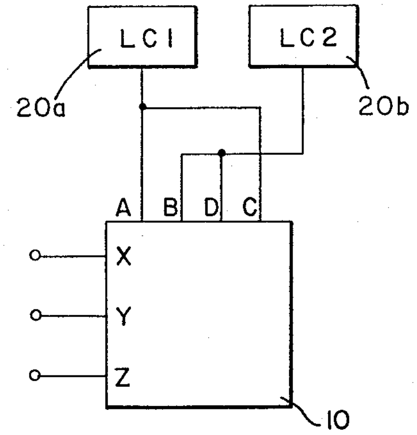

FIG. 3*b* illustrates a block of one cascode cell 10, having the A and C terminals "wired-ANDed" together and the B and D terminals "wired-ANDed" together. Each "wire-ANDed" connection is coupled to a load cell, for purposes explained relative to FIG. 7.

Figure 4:
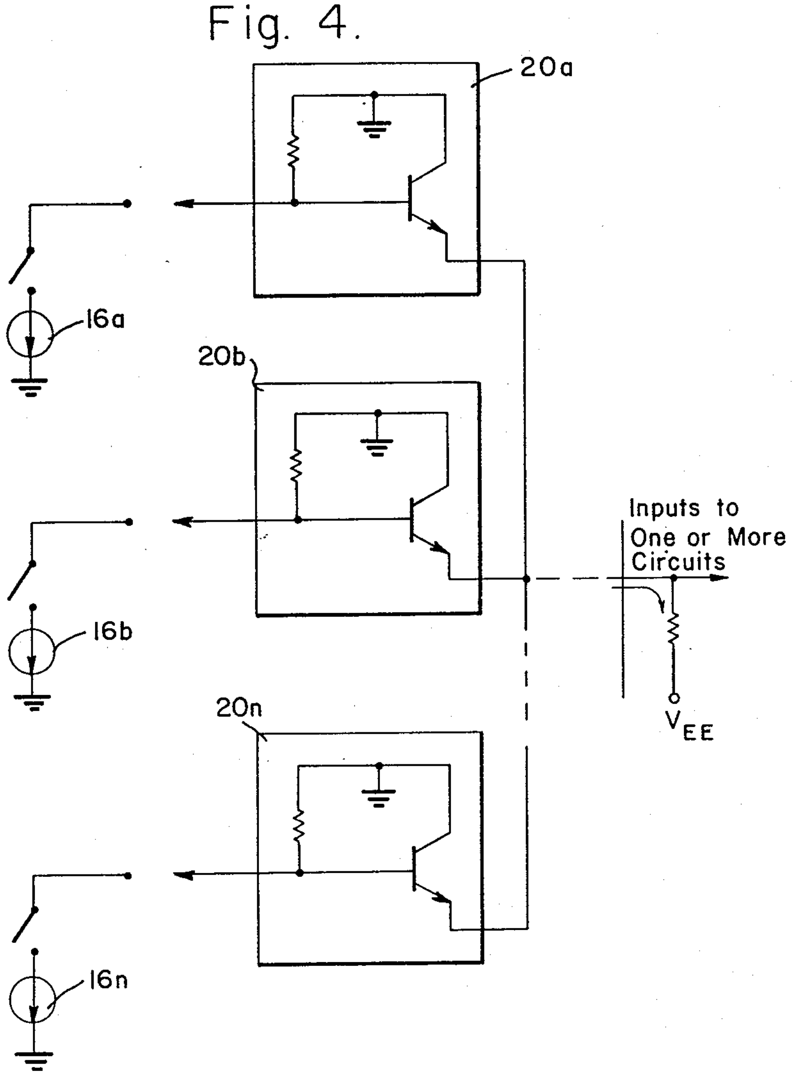
FIG. 4 is a schematic diagram demonstrating an "implicit-OR" or a "wired-OR" connection between load cell outputs.

A "wired-OR" or "implicit-OR" gating connection is now described with reference to FIG. 4. The diagram of FIG. 4 illustrates switched current sources 16*a*, *b* and *c* which represent the currents flowing from respective cascode cells. The collector nodes of these representative cascode cells are connected to respective load cells 20*a*, 20*b* to 20*n* which may be 20*a*–20*c*, shown here for simplicity without clamp circuitry which is present in each. The output terminals 55 of these load cells are wired together to form the "wire-OR" connection. If all the current switches 16*a*–16*c* are closed and switched currents of at least $I_{sw}$ are flowing in each of them, the respective outputs of the load cells has a 0 or false output signal. If switched current $I_{sw}$ is not flowing in any one or all of the current branches then at least one of the load cells has a 1 or "true" output and therefore the "wired-OR" connection has a "true" output. Thus the load cells having their respective output terminals wired together provide an OR-gate.

Figure 5:
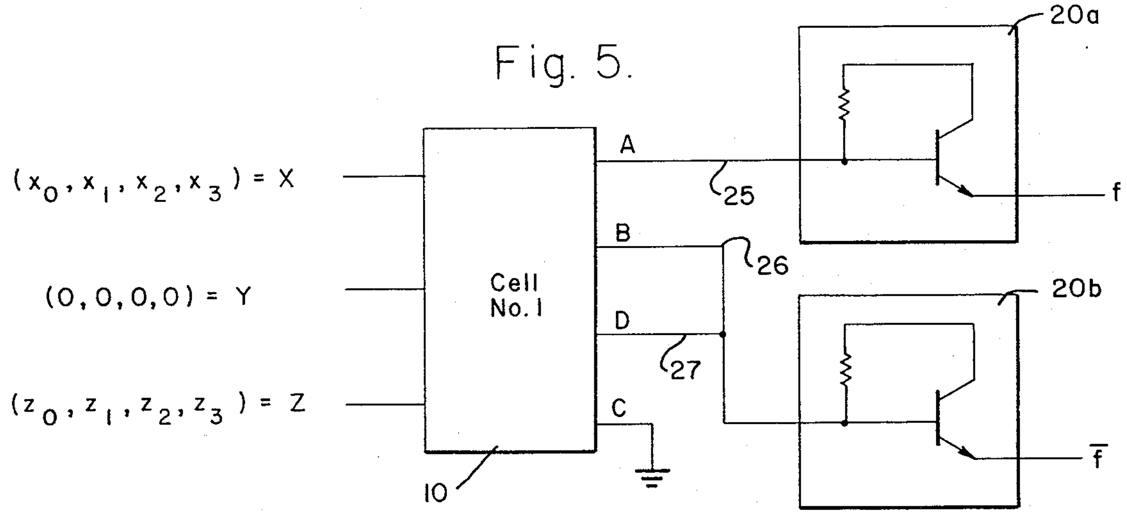
FIG. 5 is a block and schematic circuit diagram illustrating a network, logically equivalent to an OR gate fed by two four input AND gates according to the present invention, which may be considered a "bussed OR-gate."

FIG. 5 is representative of a particular cascode cell-load cell combination utilizing a single cascode cell 10 and two load cells 20*a* and 20*b* for providing a circuit logically equivalent to an OR gate fed by 2, 4-input AND gates which may be considered as a "bussed-OR-gate." The load cell 20*a* provides the output function $f$ while the load cell 20*b* provides the complement function $\overline{f}$.

The collector node A is coupled to the input terminal (such as 56 of load cell 20*a* shown earlier in FIG. 1) of the load cells 20, shown as a single emitter-follower stage here for purposes of simplicity. The collector nodes B and D are "wire-ANDed" together and connected to the input terminal of the second load cell 20*b*. The collector node C is coupled to ground level thereby providing a return path for idle current if provision for idle current injection is incorporated in the cascode circuit. Otherwise node C may be simply not connected. For purposes of discussion, each single input terminal X, Y and Z in FIG. 5 is representative of four individual input terminals $x_0$, $x_1$, $x_2$, $x_3$, $y_0$, $y_1$, $y_2$, $y_3$ and $z_0$, $z_1$, $z_2$, $z_3$, respectively.

For the particular case at hand it is noted that the collector node C is coupled to ground or not connected and Y input signals are not used. i.e. $y_o = y_1 = y_2 = y_3 = 0$ logically. The universal logic gate circuit when programmed according to FIG. 5 is capable therefore of implementing 3 and 4-variable logic function of the form:

$$f = \overline{X} + \overline{Z}$$

where $$X = x_0 + x_1 + x_2 + x_3$$
$$Y = O$$

and $$Z = z_0 + z_1 + z_2 + z_3$$

(where "+" denotes a logical OR operation)
so that $$f = \overline{\bar{x}_0\bar{x}_1\bar{x}_2\bar{x}_3} + \overline{\bar{z}_0\bar{z}_1\bar{z}_2\bar{z}_3}$$

(where the juxtaposition of two or more logical variables denotes their logical AND) The function produced at the output of load cell 20*b* is expressed as:

$$f = \overline{X} + \overline{Z} = (\overline{\bar{x}_0\bar{x}_1\bar{x}_2\bar{x}_3} + \overline{\bar{z}_0\bar{z}_1\bar{z}_2\bar{z}_3})$$

or equivalently $$\bar{f} = \overline{X} \cdot \overline{Z} = (\overline{\bar{x}_0\bar{x}_1\bar{x}_2\bar{x}_3}) + (\overline{\bar{z}_0\bar{z}_1\bar{z}_2\bar{z}_3})$$

which is readily identified as the complement of that produced at the output of load cell 20*a*.

Now to show that the network of FIG. 5 is logically equivalent to an OR/NOR gate fed by two 4-input AND gates, suppose that logical variables $\bar{a}, \bar{b}, \bar{c}, \bar{d}$ and $\bar{e}, \bar{f}, \bar{g}, \bar{h}$ are connected respectively to input terminals $x_0$, $x_1$, $x_2$, $x_3$ and $z_0$, $z_1$, $z_2$, $z_3$. Thus from the above, $f = \overline{X} + \overline{Z}$ and therefore $f = abcd + efgh$ which is the OR of two 4-input ANDs. The signal output from the second load cell has already been shown to be the logical complement of that produced at the output of the first. Hence, in this example, it must implement the NOR of two 4-input ANDs. Finally the general applicability of the network is synthesis of some functions of 4 and fewer inputs is shown by noting that a number of such functions have two and fewer product terms in their minimal sum of products expansion. $\overline{grst} + \overline{g}rs = h$ is one such function; it could be realized using the network of FIG. 5 by connecting signals $\bar{q}$, $r$, $s$, $\bar{t}$ to the $x_0$, $x_1$, $x_2$, $x_3$ terminals and connecting signals $q$, $\bar{r}$, $\bar{s}$, to any 3 of the terminals i $z_0$, $z_1$, $z_2$, $z_3$.

In the general case suggested by FIG. 5, it should be noted that one cascode cell and two load cells can synthesize a four variable function sum-of-products (disjunctive) expansion as illustrated above by the expression of output states $f$ and $\bar{f}$ as a function of the input states X and Z. It is further noted that to synthesize a "bussed-OR gate" function it is necessary to have one more load cell than cascode cells.

It is pointed out that the general rule for connecting cascode cells and load cells for forming a circuit equivalent to an OR-gate fed by AND gates is as follows:

The A collector node is coupled to a first load cell; the B and D collector nodes are coupled to a second load cell; and the C collector node is connected to ground to provide an idle current return path or otherwise not connected. The first load cell provides the output function and the second load cell provides the complement function wherein the logical complements of the signals which would be fed to the "AND" gates in the equivalent circuit, are coupled to the X and Z inputs of the cascode cells and wherein the Y inputs are not connected or are held at logic 0. It is further understood that the circuit just described but with perhaps different inputs (i.e. some or all non-complemented) and/or the role of outputs reversed, will generate a function in the same equivalence class wherein the equivalence classification system is as described subsequently.

Figure 6:
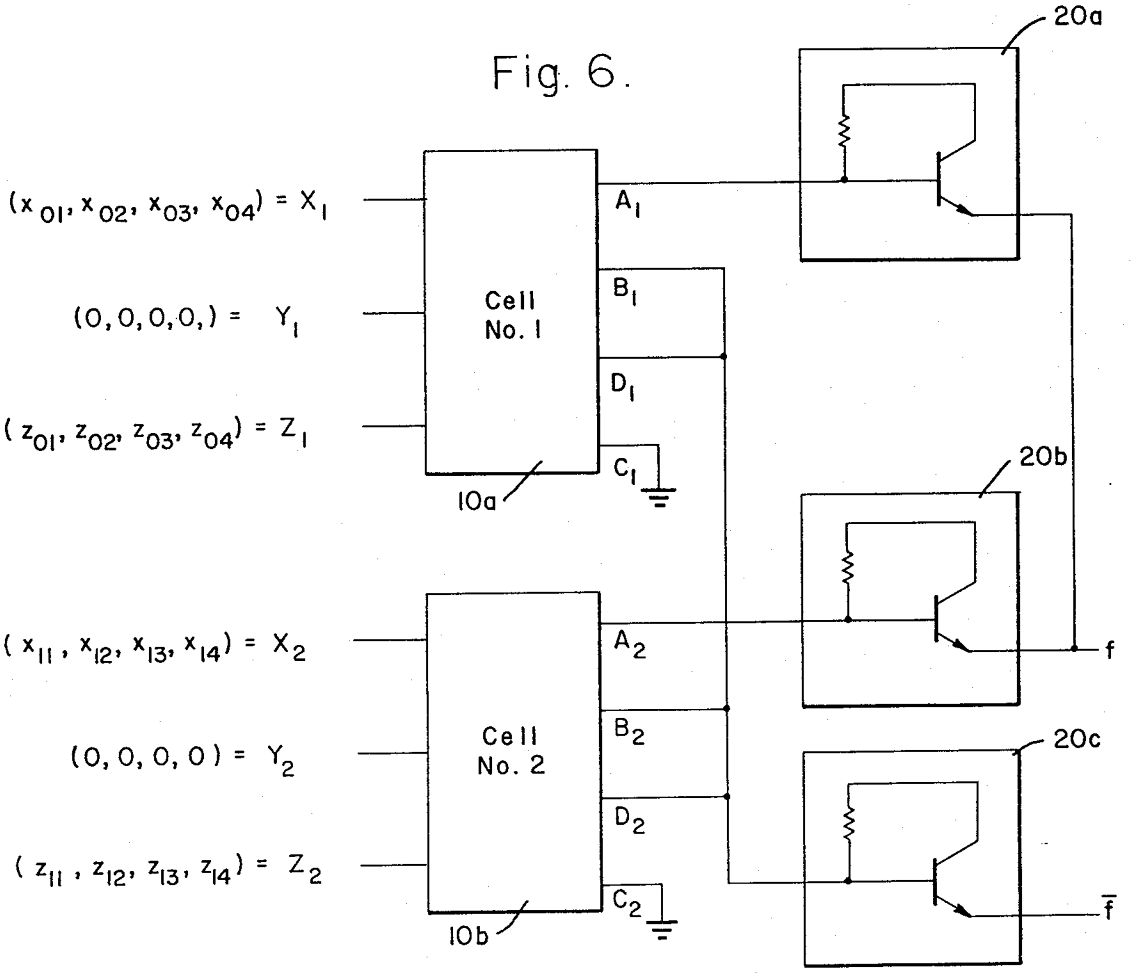
FIG. 6 is a block and schematic circuit diagram illustrating a typical two cascode cell configuration logically equivalent to an OR-gate fed by four 4-input AND-gates, and which may be considered as a "double-bussed OR-gate."

FIG. 6 is representative of another cascode cell-load cell configuration utilizing two cascode cells 10*a* and 10*b* and three load cells 20*a*, 20*b* and 20*c* for providing a circuit logically equivalent to an OR gate fed by 4, 4-input AND gates for synthesizing 3 and 4-variable logic functions and which may be considered as a "double-bussed-OR-gate."

The collector nodes $A_1$ and $A_2$ are coupled to load cells 20*a* and 20*b* respectively, and the outputs of these load cells are "wire-ORed" together for producing the output function. The collector nodes $B_1$, $D_1$, $B_2$ and $D_2$ are "wire-ANDed" together and to the load cell 20*c* for producing the complement of the function $\bar{f}$. The collector nodes $C_1$ and $C_2$ are connected to ground level or to an appropriate (positive) supply voltage to persuade a return path for idle currents if provision for said currents is included, or otherwise these terminals are not connected.

The universal logic gate when connected or programmed according to FIG. 6 is capable of implementing logic functions of the form:

$$f = (\overline{Z}_1 + \overline{X}_1) + (\overline{Z}_2 + \overline{X}_2)$$

where $$Z_1 = z_{10} + z_{11} + z_{12} + z_{13}$$
$$X_1 = x_{10} + x_{11} + x_{12} + x_{13}$$
$$Z_2 = z_{20} + z_{21} + z_{22} + z_{23}$$
$$X_2 = x_{20} + x_{21} + x_{22} + x_{23}$$

and where $$Y_1 = Y_2 = 0.$$

The ULG as connected or programmed in FIG. 6 simultaneously produces the complement function $\bar{f}$ without additional gating. The output complement is expressed as:

$$\bar{f} = (\overline{\overline{X}_1 + \overline{Z}_1}) + (\overline{\overline{X}_2 + \overline{Z}_2})$$

The network is now shown to be equivalent logically to that formed by four 4-input AND gates feeding a 4-input OR/NOR gate as follows: let the logical siginals $\bar{a}\,\bar{b}\,\bar{c}\,\bar{d}$, $\bar{e}\,\bar{f}\,\bar{g}\,\bar{h}$, $\bar{j}\,\bar{h}\,\bar{l}\,\bar{p}$, $\bar{r}\,\bar{s}\,\bar{t}\,\bar{u}$ be respectively connected at the terminals $x_{10}$, $x_{11}$, $x_{12}$, $x_{13}$, $z_{10}$, $z_{11}$, $z_{12}$, $z_{13}$, $x_{20}$, $x_{21}$, $x_{22}$, $x_{23}$, and $z_{20}$, $z_{21}$, $z_{22}$, $z_{23}$. Then $\overline{X} = abcd$, $\overline{Z} = efgh$, $\overline{X}_2 = jklp$, and $\overline{Z}_2 = rstu$. Thus $f = abcd + efgh + jklp + rstu$. From the above general result with $f$ developed at the output terminal common to the emitter followers of load cells 20*a* and 20*b*, it follows that $\bar{f}$, the complement produced of the output of load cell 20*c* must be equivalent to that formed by the NOR of four 4-input AND gates. It is again noted that one more load cell than cascode cell is required for synthesizing the above function.

Figure 7:
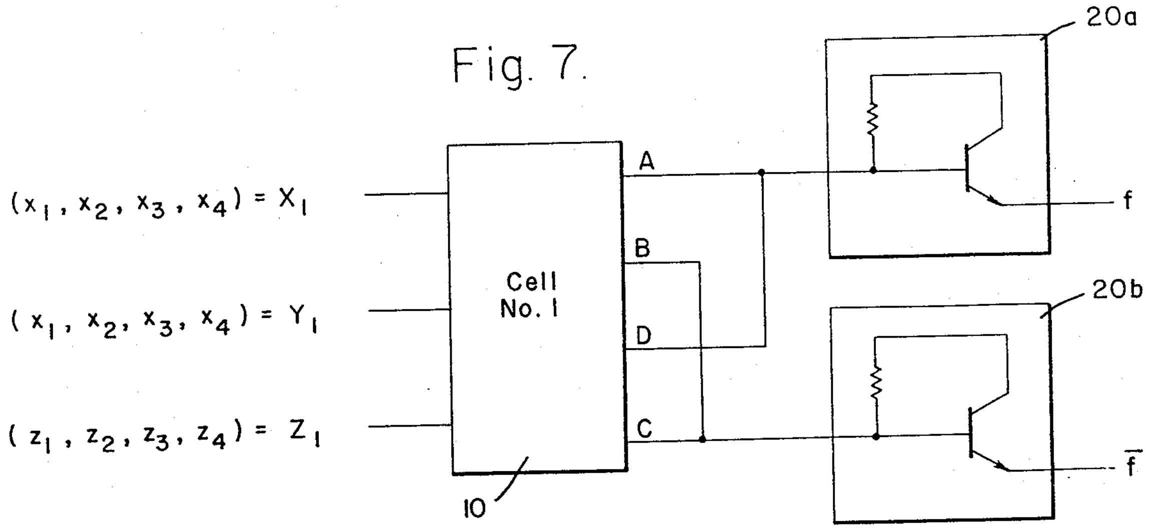
FIG. 7 is a block and schematic circuit diagram illustrating a typical gate configuration logically equivalent to an "EXCLUSIVE-OR" gate fed by two 4-input AND gates, and which may be considered as a "bussed-EXCLUSIVE-OR" gate.

FIG. 7 illustrates a cascode cell-load cell circuit utilizing a cascode cell 10 and two load cells 20*a* and 20*b* for providing a network logically equivalent to an "exclusive-OR" gate fed by two 4-input AND gates which may be considered as a "bussed-EXCLUSIVE-OR-gate."

The collector nodes A and D are "wire-ANDed" together and coupled to the load cell 20*a* for producing the output function $f$. The collector nodes $B$ and $C$ are "wire-ANDed" together and connected to the second load cell 20*b* for simultaneously producing the complement function $\bar f$. The $X$ signal input terminals are connected to the Y input terminals.

It is pointed out that the general rule for connecting cascode cells and load cells for forming a "bussed-EXCLUSIVE-OR-gate" is as follows:

The A and D collector nodes are wire ANDed together and connected to a first load cell and the B and C collector nodes are wire ANDed together and connected to a second load cell. The first load cell provides the complement function. It is further pointed out that in the exclusive-OR configuration the X and Y-input terminals are connected together.

The ULG according to FIG. 7 synthesizes logic functions of the form:

$$f = X \oplus Z$$

where $$X = Y \text{ and}$$

where $X$ and $Z$ are as follows $X = x_o, x_1, x_2, x_3$ and $Z = z_o, z_1, z_2, z_3$. Now if logical signals $\bar a\ \bar b\ \bar c\ \bar d$ are connected to inputs $x_o, x_1, x_2, x_3$ ($Y_o, Y_1, Y_2, Y_3$) and signals $\bar e\ \bar f\ \bar g\ \bar h$ are connected to inputs $z_o, z_1, z_2, z_3$ then $f = abcd \oplus efgh$ which is the function which would be generated by a logically equivalent network of two 4-input AND gates feeding on EXCLUSIVE-OR gate. The complement function is:

$$\bar f = \overline{X \oplus Z} \equiv \bar X \oplus Z \equiv X \oplus \bar Z$$

Figure 8:
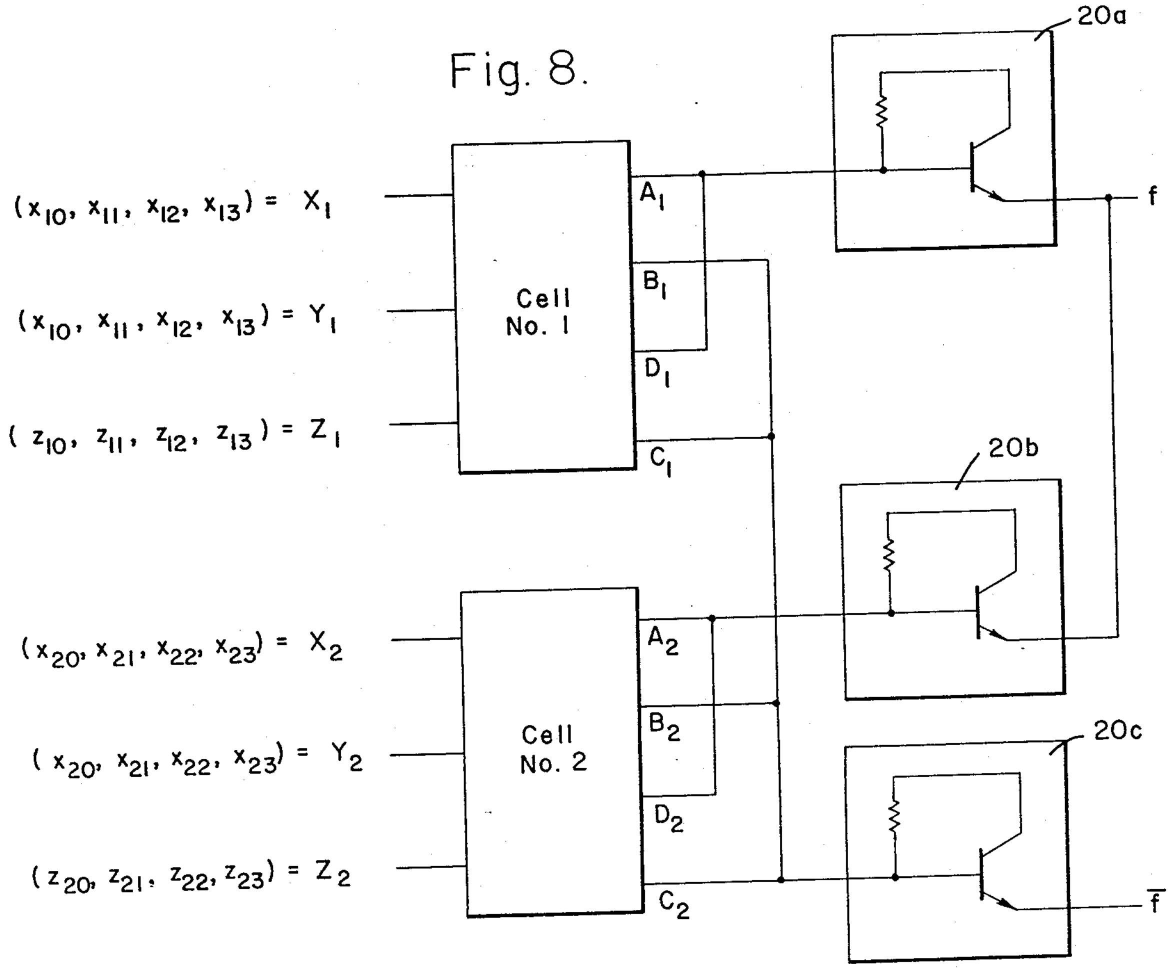
FIG. 8 is a block and schematic circuit diagram illustrating a typical two cascode cell network logically equivalent to an OR gate, fed by two EXCLUSIVE-OR gates, each of which is in turn fed by two 4-input AND gates and which may be considered as a bussed-OR EXCLUSIVE-OR-gate.

FIG. 8 illustrates another cascode cell-load cell configuration utilizing two cascode cells 10*a* and 10*b* with three load cells 20*a*, 20*b* and 20*c* which is logically equivalent to an OR-gate fed by two "EXCLUSIVE-OR" gates, each of which is in turn fed by two 4-input AND gates.

The collector nodes $A_1$ and $D_1$ are "wire-ANDed" together and connected to the load cell 20*a*. The nodes $A_2$ and $D_2$ are "wire-ANDed" together and coupled to the load cell 20*b*. The outputs of the load cells 20*a* and 20*b* are "wire-ORed" together for providing the output function $f$. The collector nodes $B_1$, $C_1$, $B_2$and $C_2$ are "wire-ANDed" together and coupled to the third load cell 20*c* for providing the output complement $\bar f$. The $X_1$ and $Y_1$ input terminals are coupled together and the $X_2$ and $Y_2$ input terminals are coupled together.

The cascode-load cell configuration according to FIG. 8 synthesizes an OR function of two "EXCLUSIVE-ORs" of the form:

$$f = (X_1 \oplus Z_1) + (X_2 \oplus Z_2) \cdot \equiv (\bar X_1 \oplus \bar Z_1) + (\bar X_2 \oplus \bar Z_2)$$

with $$Y_1 = X_1,\ Y_2 = X_2 \text{ and}$$

where $X_1$, $X_2$, $Z_2$ and $z_2$ are as described above. The complement function is:

$$\bar f = \overline{(X_1 \oplus Z_1) + (X_2 \oplus Z_2)} \equiv \overline{(X_1 \oplus Z_1)}\ \overline{(X_2 \oplus Z_2)}.$$

As shown above in the discussion pertaining to FIG. 7, when complement literals such as $\bar a, \bar b, \bar c, \bar d$ and $\bar e, \bar f, \bar g, \bar h$ are fed to input terminals $x_{01}, x_{11}, x_{12}, x_{13}$, ($Y_{01}$, $Y_{02}$, $Y_{03}$, $Y_{04}$) and $z_{01}, z_{11}, z_{12}, z_{13}$ respectively, the term $x_1 \oplus Z_1 = abcd \oplus efgh$. Therefore since the function f above formed by the network of FIG. 8, is the logical OR of two such terms, the overall function must be logically equivalent to one which would be generated by an OR-gate fed by two EXCLUSIVE-OR gates, each of which is in turn fed by two four-input AND-gates.

Figure 9:
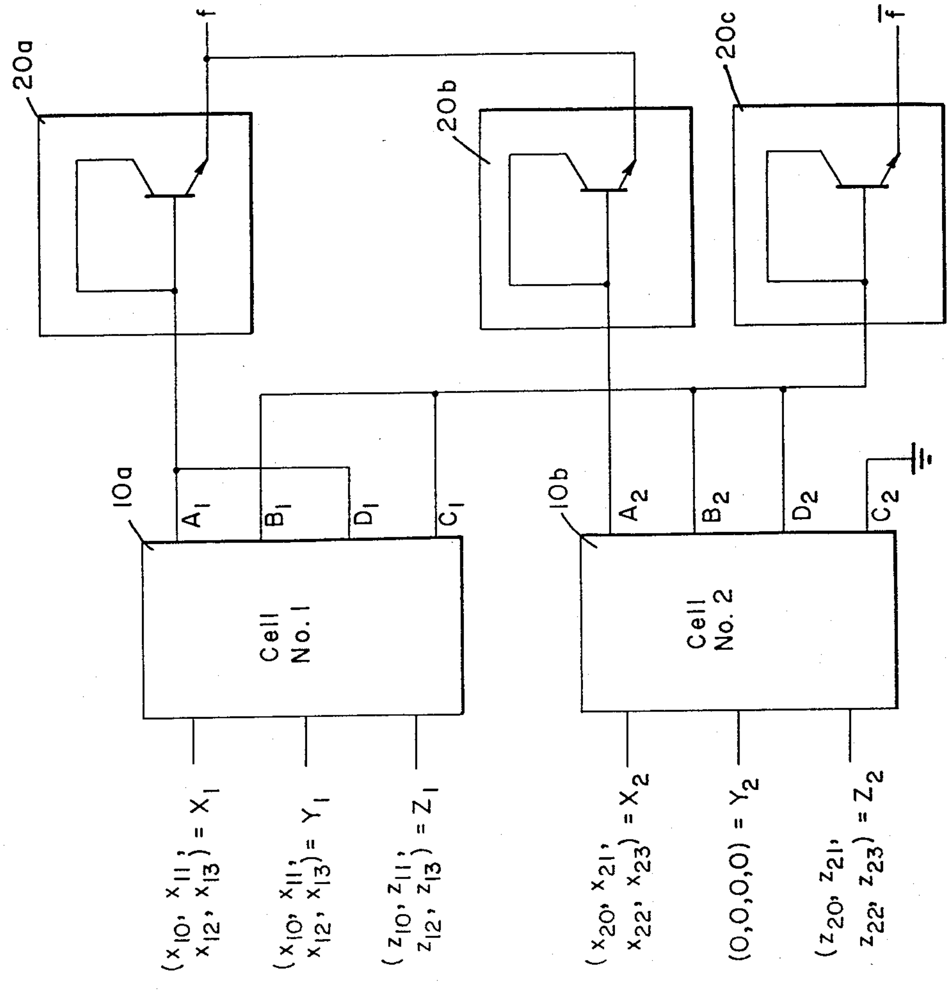
FIG. 9 is a block and schematic circuit diagram illustrating a typical two cascode cell "OR"-"EXCLUSIVE-OR" configuration according to the invention logically equivalent to an OR-gate fed by another OR-gate and an EXCLUSIVE-OR gate, the latter OR and EXCLUSIVE-OR gates each being fed by two 4-input AND-gates.

FIG. 9 depicts a cascode circuit-load cell combination utilizing two cascode circuits 10*a* and 10*b* with load cells 20*a*, 20*b* and 20*c* for implementing a network logically equivalent to an OR gating of an OR-gate and an "EXCLUSIVE-OR gate" where each of these second gates is in turn fed by two 4-input AND gates.

The collector nodes $A_1$ and $D_1$ are "wire-ANDed" together and coupled to the load cell 20*a*. The node $A_1$ is coupled to the load cell 20*b* and the outputs of load cells 20*a* and 20*b* are "wire-ORed" together to provide the output function $f$. The collector nodes $B_1$, $C_1$, and $D_2$ are "wire-ANDed" together and to the load cell 20*c* for providing the complement function $\bar f$. The node $C_2$ is returned to ground level or to an appropriate power supply voltage if provision for idle currents is included in the cascode current switch and otherwise not connected. The $X_1$ and $Y_1$ input terminals of the cascode cell 10*a* are coupled together. The $Y_2$ input terminals are not connected.

The logic gate combination in the illustrated example synthesizes an OR function of an OR-gate and an "EXCLUSIVE-OR" gate which OR function has an expression of the form:

$$f = (X_1 \oplus Z_1) + (X_2 + Z_2)$$

where $$X_1 = Y_1 \text{ and } Y_2 = 0 \text{ and}$$

where $X_1$, $X_2$, $Z_1$ and $z_2$ are as described above. The complement function is of the expression:

$$\bar f = \overline{(X_1 \oplus Z_1) + (X_2 + Z_2)} \equiv \overline{(X_1 \oplus Z_1)}\ (\bar X_2 \bar Z_2)$$

As shown above, if sets of four complement input signals are fed to $X_1$, $Z_1$, $X_2$, and $Z_2$ input sets, then the term $X_1 \oplus Z_1$ is of the form $abcd \oplus efgh$ while the second term is of the form $X_2 \oplus Z_2 = jklp + qrst$. Thus the overall function is logically equivalent to one formed by an OR-gate fed by another OR-gate and an EXCLUSIVE-OR gate, each of these in turn fed by two 4-input AND-gates.

There are a possible 65,536 different logic functions of 4 and fewer variables. When conventional CSEF ECL gates are used to implement these functions, only 222 different (generally 2-stage) gate networks are required wherein each network differs from the others by the number of gates incorporated and the way that they are interconnected both inside the network and to the set of network input leads or terminals. Since each such network implements both complements and uncomplemented functions simultaneoulsy, larger networks built up of these 4-variable component networks entail the transmission of both complemented and uncomplemented signals between the component networks. Each component network may therefore have as many as eight input leads or terminals to accommodate some or all of the 4 uncomplemented and some or all of the four complemented input signals.

When such networks implementing 4 (and fewer) input functions are used, different functions are realized by each single fixed network when the connections between the input signals and the network inputs are charged and/or when the output connections from the networks are exchanged. Altogher there are three different "hardware free transformations" that are used to change from one function to another while using the same network. These are: (1) Input permutations - exchanging one or more pairs of input signals at the network input terminals, (2) input complementation - exchanging complemented and uncomplemented signals at the network input terminals, and (3) output complementation - using the complement network output to realize the function and the uncomplemented network output to realize the complement function or conversely.

Logic functions in relation to equivalence classification are more fully explained in "Introduction to Switching and Automata Theory" by M. A. Harrison at Chapter 5 entitled "Transformation Groups and Group Invariance." Included there is a discussion of the above classification system as well as a discussion of other similar systems applicable when other logical elements such as relays or NAND gates are used. In general the number of equivalence classes or different logic networks required to implement all the functions of 4 and fewer inputs and the rules for connecting these networks is different from that described above when different logical elements are used. The particular classification system applicable to CSEF networks is important here because precisely the same system is applicable to realization of the 4 and fewer input functions using the ULG which is the subject of this disclosure. A complete listing of the appropriate classification identification is found in the Appendix 4 of the aforementioned textbook at pages 396–407.

ULG networks logically equivalent to one of the 222 different CSEF networks are formed from one of the networks shown in FIGs. 5 to 9 or from a small set of additional networks similar to those, when the cascode cell inputs are cross interconnected and a smaller set of up to eight network input terminals are coupled to selected cell input points. The way that these connections between cell inputs and network inputs are made is illustrated in relation to the network of FIG. 5 for the class of functions representable by a minimum sum of products expansion comprising 2 product terms, each product term made up of 3 literals. In this case three of the Z cell inputs and three of the X cell inputs would simply be brought out as network inputs. The arrangements that provide different functions in this above-described class are realized using the network of FIG. 5 is further illustrated in subsequent descriptions such as that related to FIG. 10.

Figure 10:
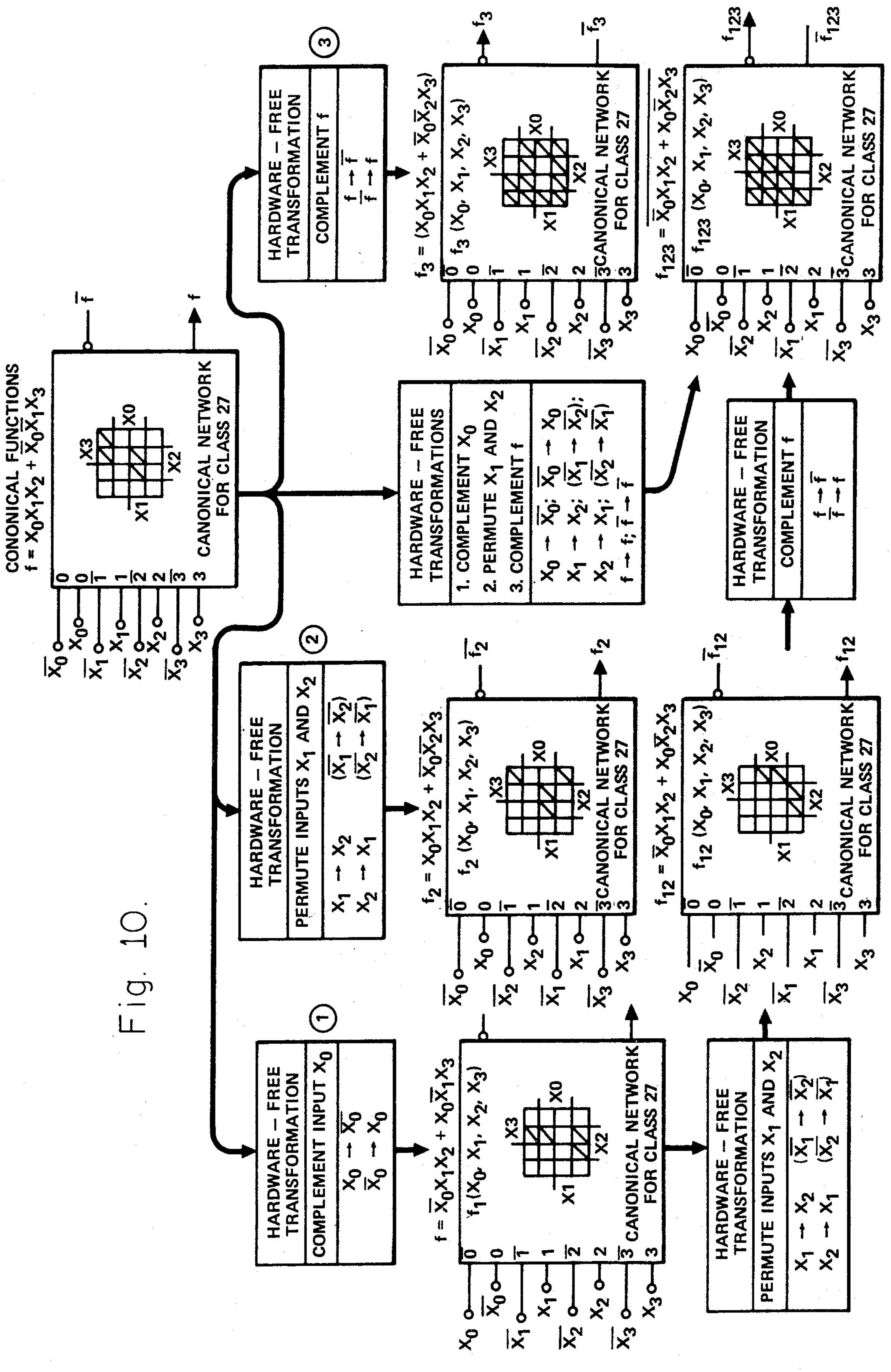
FIG. 10 is a flow diagram depicting the various "hardware-free" transformations that typically may be performed utilizing the invention for generating the member function within the class of functions all realizable using the same network.

FIG. 10 depicts a particular class of 4-input logic functions that may be synthesized by a single cascode cell 10 and two load cells **20*a* and 20*b* in an OR-gate configuration of FIG. 5. Each block represents ULG implementation of the functions within class 27 as classified by Harrison. A Karnaugh map within each block illustrates the function and its input states. The block 10*a* represents the realization of the canonical expression of the family of functions that may be synthesized by this "bussed OR-gate." Block 10*b* represents the function that is synthesized when the input signal $X_0$ is complemented. Block 10*c* depicts the function that may be realized when the input signals $x_0$ and $x_1$ are permuted. Block 10*d* depicts the function that is synthesized when the output signals are complemented. Block 10*e* demonstrates the function that is synthesized when the input signals $x_0$ and $X_1$ are permuted after the input complementation of block 10*b*. The block 10*f* shows the function that is synthesized when all three types of hardware-free transformations are made to the circuit of the canonical expression. In the case depicted, the input signal $x_0$ is complemented, the input signals $x_1$ and $x_2$ are permuted and the output is complemented. Thus, it has been illustrated that one network of the type shown in FIG. 5** may synthesize several 4-input logic functions which all fall within the same class of functions.

Functions identified by Harrison as in the following equivalence classes may be realized by the network shown in FIG. 5, albeit with differing cell input to network connections: 2,3,4,5,6,7,8,10,13,14,16,20,27, 32,33,35,60,61,62,75,146,166,183. Class 165 requires no network as it contains only totally degenerate functions (those always identical to logical 1 or to logical 0). Class number 1 contains functions of one variable only (e.g. $\overline{a}$) and therefore requires no ULG network. 145 of the 222 classes can be realized using the network of FIG. 6. For these classes, each function can be expressed as a four term sum of products expansion. Again with ULG collector and load cell output programming connections first fixed as diagrammed in FIG. 6, additional programming through different input signal to cascode input connection accomplishes the remaining operations necessary to select the particular equivalence class of functions implemented by the network.

The FIG. 11 tabulates the remaining 52 classes of 4-input logic functions that may be synthesized by utilizing the universal logic gate in various configurations many of which were shown in FIGs. 7,8, and 9. In the FIG. 11 tables the "class No." refers to the Harrison classification of a family of functions "Cell Use" refers the use to which the cascode cell-load cell combination has been dedicated in a particular network. A particular cell may be described in terms of logical equivalent circuits wherein it is used as a "bussed-OR-gate" (FIG. 5), a "bussed-EXCLUSIVE-OR-gate" (FIG. 7) or as a NOR-gate each being fed by two 4-input AND gates as has been fully explained above. A simple NOR-gate is formed in one cell in the arrangement FIG. 5 by providing a constant logical 1 state to the $Z$ input terminal and leaving the Y terminals unconnected. One way in which this biasing to logical one may be conveniently provided in accordance with the invention is to connect a load cell output to that input wherein the load cell input is not connected. The table's use is suggested in relation to class 39 for example. As shown in line –1 of the table in class 39 the first cascode cell is "wired" as an "OR-gate" fed by AND gates which circuit connection has been fully explained above. Next, the input signal connections to the cascode cells are tabulated. The headings $X_1$, $Y_1$ and $Z_1$ under "Cell 1" refer to the input terminal connections to the first cascode cell. $X_1$ represents the input signals $X_0$, $x_1$, $x_2$ and $x_3$ to the quad transistor 21. $Y_1$ represents the input signals $Y_0$, $Y_1$, $Y_2$ and $Y_3$ to the quad transistor 24 and $Z_1$ is the input signals $z_0$,$z_1$,$z_2$ and $z_3$ of the quad transistor 37. For example, the X input signals to the first cascode cell of class 39 are $\overline{x}_1$, and $\overline{x}_3$ while the Y input terminal is not connected and the Z input signals are $\overline{x}_2$ and $\overline{x}_3$.

The table may be used for expressing the function and its complement in terms of a Boolean Algebraic expansion. For example, the expression for class 39 is:

$$f = (X_1 + Z_1) + (X_2 \quad Z_2) + (X_3 + Z_3)$$

where $$X_1 = X_1 + x_3,\ Y_1 = 0, \text{ and } Z_1 = x_2 + x_3$$
$$X_2 = Y_2 = x_0 + x_1; \text{ and } z_2 = x_0 + x_2 + x_3$$

and $$X_3 = x_0 + x_1 + x_2 + x_3,\ Y_3 = 0, \text{ and } Z_3 = x_0 + 0\, x_1 + x_2.$$

It is pointed out that the first bracketed term, $(X_1 + Z_1)$, is synthesized by the first cascode cell which is in an "OR-gate fed by AND gates" configuration. The second and third bracketed terms of the expansion are synthesized by the second and third cascode cells, respectively. It is further pointed out that each cascode cell synthesizes two terms of the expansion. For example, the first OR-gate cascode cell of the above class synthesizes the term $x_1\ x_3 + x_2\ x_3$. The complement of the overall function representing one of those in class 39 may be expressed as:

$$f = (X_1 + Z_1)\ (X_2 \quad Z_2)\ (X_3 + Z_3)$$

The above table details the ULG synthesis of all but one of the 52 classes of functions not realizable using the networks of FIG. 5 or 6.

The remaining 4-variable logic function is commonly called a parity function $P_4$ and is discussed with reference to FIGS. 12*a* and 12*b*. This function is "true" whenever either any exactly one or any exactly three of the signals fed to it are "true" and it is zero otherwise.

In the $P_4$ realization suggested in FIG. 11*a*, the collector nodes A and D of the first cascode cell 10*a* are "wire-ANDed" together and in this discussion the function formed at this connection is called the function *f*. The collector nodes B and C are "wire-ANDed" together and this connection is referred to here as the complement of the function *f*, i.e. $\bar{f}$. The collector nodes A and D of the second cascode cell 10*b* are "wire-ANDed" together and this connection is referred to here as the function *g*. The collector nodes B and C of cell 10*b* are "wire-ANDed" together and called the *g* functions's complement i.e. $\bar{g}$, again in this particular discussion. The signal leads *f* and $\bar{g}$ are "wire-ANDed" together forming the separate function $f\bar{g}$ which is coupled to the load cell 20*a*. The signal leads $\bar{f}$ and *g* are "wire-ANDed" together forming the function $\bar{f}g$ and that function is applied to the load cell 20*b*. The outputs of the load cells 20*a* and 20*b* are "wire-ORed" together thereby providing the function.

$$F = f\bar{g} + \bar{f}g$$

which is by definition the EXCLUSIVE-OR function:

$$F = f \oplus g$$

If the same single input signal $x_0$ is applied to both the X and Y input terminals and a single input signal $x_1$ is applied to the Z input terminal of the first cascode circuit, then the function *f* becomes:

$$f = x_0 \oplus x_1$$

Furthermore, if another single input signal $x_2$ is applied to both the X and Y input terminals of the second cascode circuit and a single input signal $x_3$ is applied to the Z input terminal of that circuit, then the function *g* becomes:

$$g = x_2 \oplus x_3$$

Consequently the function $F = f \oplus g$ may be expressed as $$F = (x_0 \oplus x_1) \oplus (x_2 \oplus x_3) \oplus \; x_0 \oplus x_1 \oplus x_2 \oplus x_3$$

where the latter expression is identical to the four input parity function; thus $$F = P_4\,(x_0, x_1\; x_2, x_3).$$

It is noted that the $P_4$ function is synthesized with two cascode cells and two load cells. Further, the above-described circuit synthesizes only the function and not the complement function $\overline{P_4}$ and an additional ULG network must be utilized for synthesizing that complement function if it is simultaneously required in larger network as an input signal to a succeeding stage.

Figure 12A:
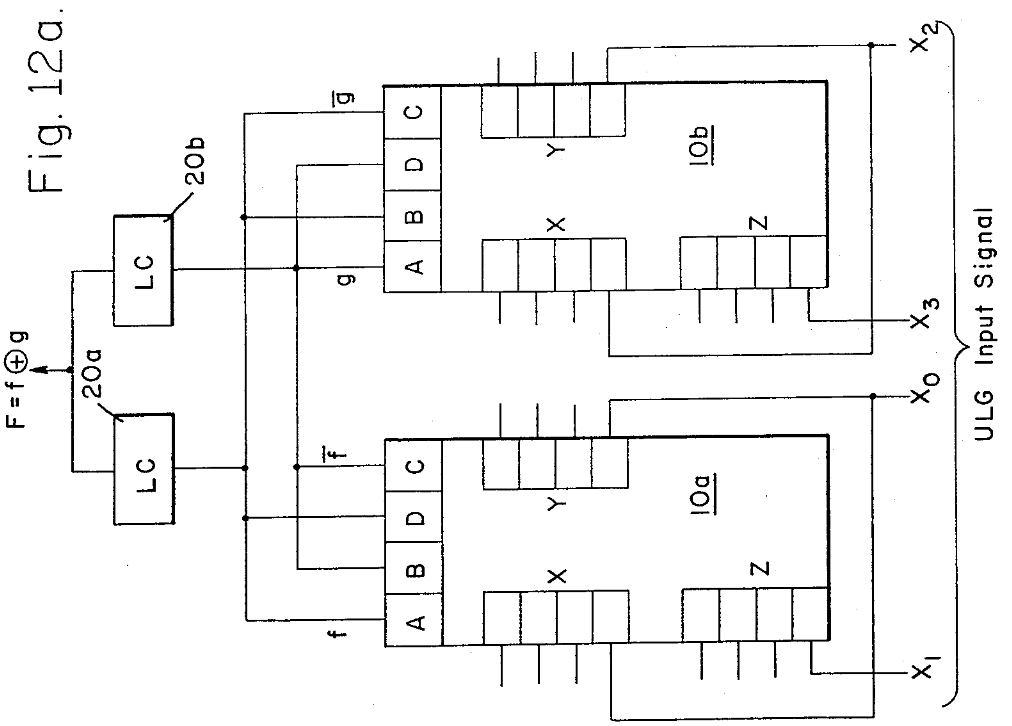
FIGS. 12*a* and 12*b* are block and schematic circuit diagrams a ULG circuit for synthesizing the four variable parity function.

The network of FIG. 12*a* may also be used to implement the complement of the parity function i.e. $P_4$ ($x_0$, $x_1$, $x_2$, $x_3$). This complement realization can be achieved by feeding any one or any three complement input signals into the network instead of feeding in all uncomplemented input signals. Alternatively a slightly different network can be used.

Figure 12B:
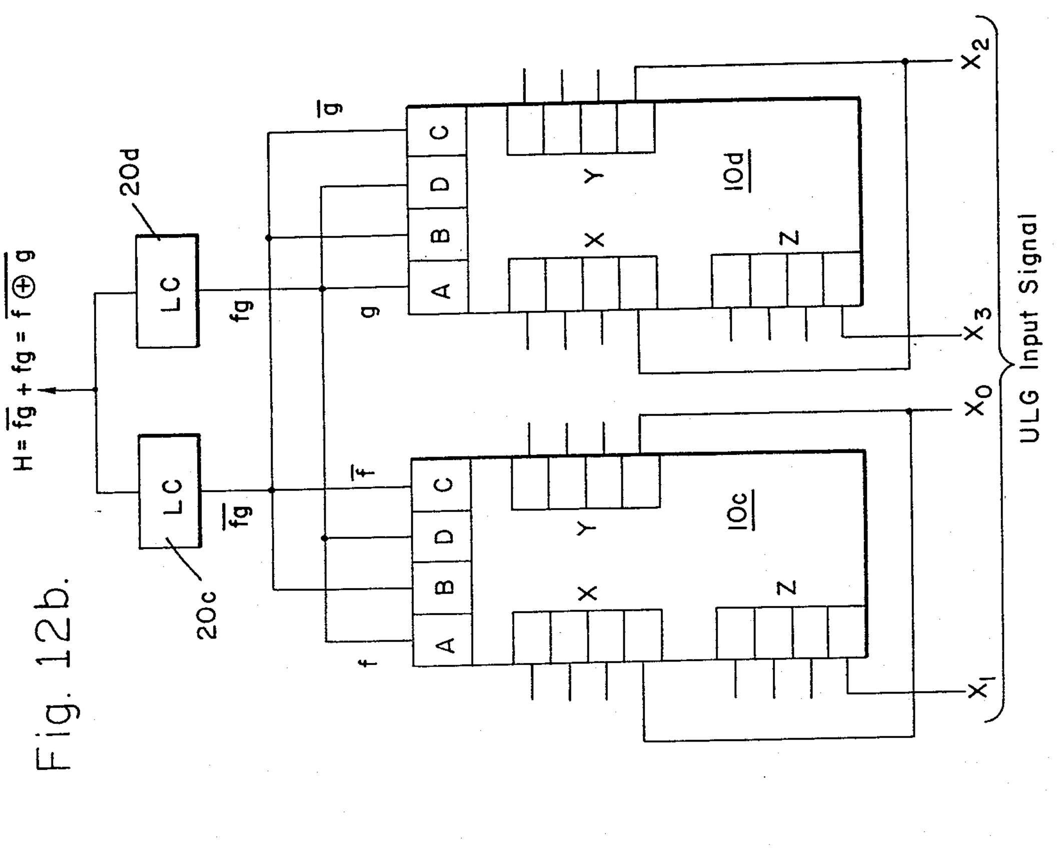

FIG. 12*b* illustrates the alternative ULG network for performing the parity complement function. In this circuit the $\bar{f}$ and $\bar{g}$ functions from the cascode cells 10*c* and 10*d* are wire-ANDed together and coupled to the load cell 20*c*. The *f* and *g* functions from the cascode cells 10*c* and 10*d* are wire-ANDed together and connected to the load cell 20*d*. The outputs of the load cells 20*c* and 20*d* are wire-ORed together for providing the complement function $H = \bar{f}\bar{g} + fg \;=\; \overline{f \oplus g}$ so that with $f = x_0 \oplus x_1$ and $g = x_2 \oplus x_3$ as above, $$H = \overline{x_0 \oplus x_1 \oplus x_2 \;\; x_3} \;=\; \overline{P}_4\,(x_0\,,\, x_1, x_2, x_3).$$

The foregoing FIGS. 1–12 are illustrative of specific examples of a universal logic gate for performing all 4-variable logic functions and their complements in a unit time delay. Time delay refers to the propagation time delay between the application of an input signal and the extraction of an output signal. If the design criteria of "ECL-10000" circuits are applied to an integrated circuit implementing the ULG, the ULG will have the same time delay which is generally about 2.5 nanoseconds. The principles presented herein are equally applicable to discrete component circuits, small scale integration, medium scale integration and large scale integration. Moreover, the ULG provides an improved power-delay product because fewer stages and gates are used resulting in lower power requirements than prior gate circuits.

The above-described networks may also implement more than 4-variable logic expressions. An example of a multi-variable logic function and the ULG connections for implementing the same are found in FIG. 13. A single cascode cell 10 and two load cells may synthesize an 8-variable input function. The X-input terminals are not connected and hence no switch current will flow in the quad-transistor 21. If provision for idle currents is included in the cascode current switch, the A-terminal is returned to ground; otherwise it is not connected. The B and C collector nodes are coupled together and to the load cell 20*a* providing the output function *f*. The collector node D is connected to the load cell 20*b* which provides the complement function $\bar{f}$. Input signals $\bar{a}$, $\bar{b}$, $\bar{c}$ and $\bar{d}$ are coupled to the Z input terminals and signals $\bar{e}$, $\bar{f}$, $\bar{g}$ and $\bar{h}$ are coupled to the Y input terminals. The output function of the 8-variables is then $$f = a\;b\;c\;d\;e\;f\;g\;h$$

which describes an 8 input AND gate.

The complement function $\bar{f}$ is described as $$\bar{f} = \overline{abcd + efgh}$$

which is the same as formed in an equivalent network of a NOR-gate of 2 AND-gates.

Figure 13:
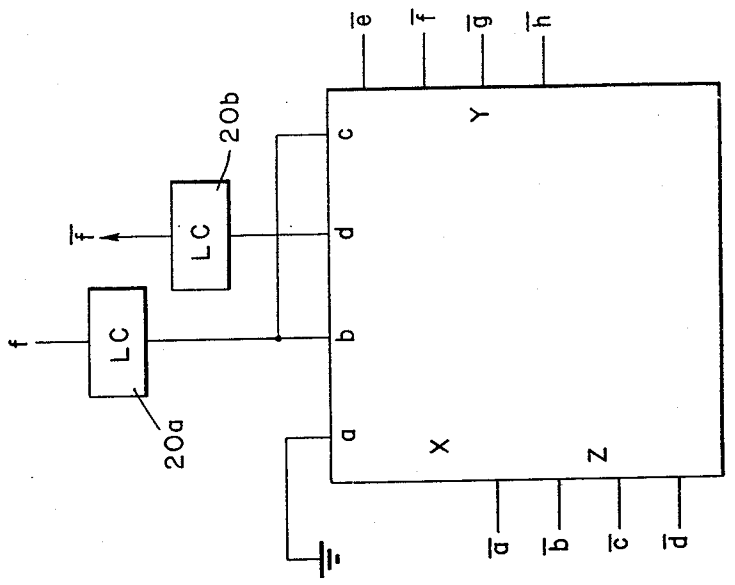
FIG. 13 is a block and schematic circuit diagram illustrating a ULG circuit used as an eight variable input AND gate.

The network of FIG. 13 not only implements the function illustrated but an entire equivalence class of functions of which the illustrated function is but one example. Other functions in the class may be implemented instead after input and/or output complementations and in general also input permutations.

A very large number of different networks for implementing functions of more than 4-input variables can be constructed using the ULG at hand and each of these networks realizes not one function but a usually large equivalence class of functions. Another example is shown in FIG. 14.

Figure 14:
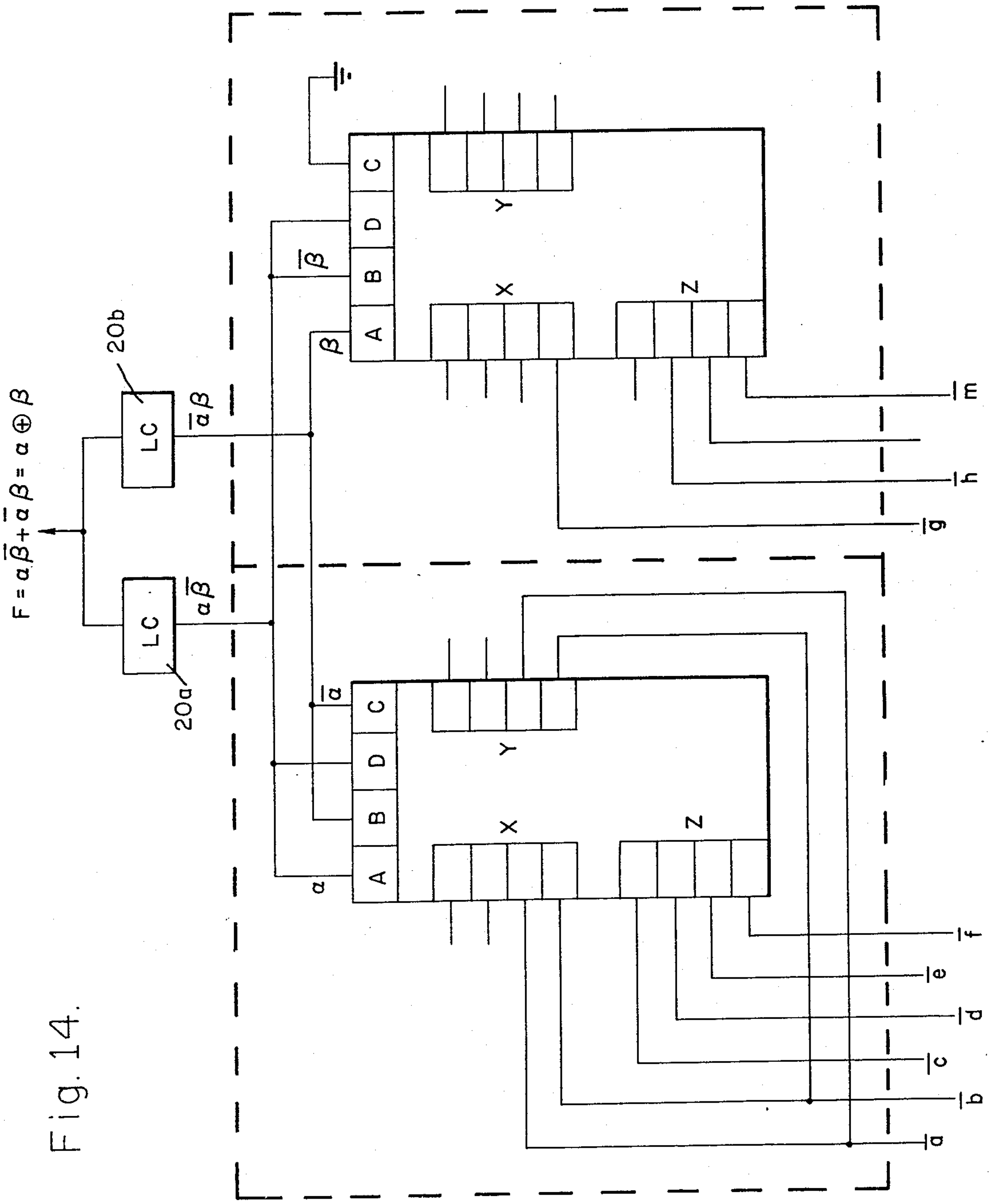
FIG. 14 is a block and schematic circuit diagram showing a ULG circuit for use as a ten variable input logic gate.

The schematic diagram of FIG. 14 illustrates two cascode circuits in combination with two load cell circuits for implementing a 10-input function. The first cascode cell 10*a* is wired to form a network logically equivalent to an EXCLUSIVE OR-gate fed by two AND gates, while the second cascode cell 10*b* is wired as a typical OR-gate fed by AND gates. The A and D collector current nodes of the cascode cell 10*a* are wire ANDed to the B and D collector current nodes of the cascode cell 10*b* and this connection is coupled to the load cell 20*a*. The B and D collector current nodes of the first cascode cell 10*a* are wire ANDed to the A collector current node of the second cascode cell 10*b* and this connection is coupled to the second load cell 20*b*. The outputs of the load cells are coupled together for providing a wire-ORed connection which provides the output function.

$f = [ab \oplus cdef \oplus (g + hkm)]$

It is further noted that networks using cascode cells and load cells may be formed for generating multiple output functions other than complementary pairs. It is to be noted that the principles of the invention are not limited to any particular type of switching means or transistor means but includes all types of transistors including CMOS or MOSFET IC$^s$ or any combination thereof.

It should be apparent from the foregoing that the present invention provides a universal logic gate for synthesizing all 4 -variable logic functions and their complements in a unit time delay. The ULG is implemented using specifically provided interconnection means by a selective wire ANDing of collector nodes and by selective wire ORing of load cell outputs and also by combining cascode cells and selectively interconnecting their inputs together to a smaller set of network inputs. It is to be noted that the principles of the invention are applicable to any number of gating stages in the cascode circuit.

A catalog of each of the 222 networks (classes) of 4-input logic functions as implemented by ECL-10000 CSEF gates was compiled. Another catalog of the counterpart ULG networks was also compiled. Measured gate and ULG parameters such as power and delay were then used to determine these and other quantities for each of the 222 networks (classes). Then averages of these quantities for all classes were computed. It was then found that the ULG provides a comparable time delay. It was also found that the present ULG has substantially fewer elements, gates and stages than CSEF networks which results in a decreased power requirement to about 56percent of that used by CSEF networks. Other advantages include a substantially improved power delay product by a factor of more than 2:1. Similar catalogs were developed comparing TTL or Schottky TTL and ECL circuits of CSEF gates. The ECL circuits have about a 2.5 to power delay product advantage over those built using TTL circuits. Hence the ULG has about a 5:0 power delay product advantage over TTL circuits.

The universality of a cascode cell and load cell network is demonstrated by the fact that only two "building block" networks are required for synthesizing all 4-variable logic functions as well as other multivariable functions. A desired class of functions is synthesized merely by the selective interconnection of cascode current nodes with load cell input terminals of one or more cascode circuits and two or more load cells respectively. A modular ULG network may be provided having two cascode cells in over 91 percent of the 222 classes and otherwise those cascode circuits and three or in a few cases four load cells. The collector current nodes and the load cell input terminals and the input terminals may be left unconnected for subsequent selective interconnection dependent upon the class of functions to be synthesized. Thus a universal logic circuit is provided utilizing these basic building block in accordance with the above described circuit interconnections.

Although the present invention has been shown and described with reference to particular embodiments, nevertheless, various changes and modifications obvious to one skilled in the art to which the invention pertains are deemed within the purview of the invention.

What is claimed is:

1. A universal logic gate for synthesizing logic functions having a plurality of cascode circuits and a plurality of load circuits having input and output terminals, each of said cascode circuits comprising:

an upper current switch section having first, second, third and fourth current paths; a lower current switch section having first and second main current paths, said first and second current paths of said upper current switch section being coupled to said first main current path, said third and fourth current switch paths of said upper current section being coupled to said second main current switch path;

a current switch source being coupled to said first and second main current paths;

first switching means having a plurality of input terminals for controlling the flow of said switch current in said first and second main current paths;

second switching means having a plurality of input terminals for controlling the flow of switch current in said first and second current paths of said upper current switch sections;

third switching means having a plurality of input terminals for controlling the flow of current in said third and fourth current switch paths of said upper current switch section;

selected ones of said upper current switch paths being coupled to said input terminals of selected ones of said plurality of load circuits; and selected output terminals of selected other ones of said plurality of load cells being coupled together.

2. A universal logic gate for synthesizing logic functions having a plurality of cascode circuits and a plurality of load circuits having input and output terminals, each of said cascode circuits comprising:

an upper current switch section having first, second, third and fourth current paths; a lower current switch section having first and second main current paths, said first and second current paths of said upper current switch section being coupled to said first main current path, said third and fourth current switch paths of said upper current section being coupled to said second main current switch path;

a current switch source being coupled to said first and second main current paths;

first switching means having a plurality of input terminals for controlling the flow of said switch current in said first and second main current paths;

second switching means having a plurality of input terminals for controlling the flow of switch current in said first and second current paths of said upper current switch sections;

third switching means having a plurality of input terminals for controlling the flow of current in said third and fourth current switch paths of said upper current switch section;

means for coupling together selected ones of the input terminals of selected ones of said first, second and third switching means, selected ones of said upper current switch paths being coupled to said input terminals of selected ones of said plurality of load circuits; and selected output terminals of selected other ones of said plurality of load cells being coupled together.

3. A universal logic gate for synthesizing logic functions having a plurality of cascode circuits and a plurality of load circuits having input and output terminals, each of said cascode circuits comprising:

an upper current switch section having first, second, third and fourth current paths; a lower current switch section having first and second main current paths, said first and second current paths of said upper current switch section being coupled to said first main current path, said third and fourth current switch paths of said upper current section being coupled to said second main current switch path;

a current switch source being coupled to said first and second main current paths;

first transistor means having a plurality of input terminals for controlling the flow of said switch current in said first and second main current paths;

second transistor means having a plurality of input terminals for controlling the flow of switch current in said first and second current paths of said upper current switch sections;

third transistor means having a plurality of input terminals for controlling the flow of current in said third and fourth current switch paths of said upper current switch section;

selected ones of said upper current switch paths being coupled to said input terminals of selected ones of said plurality of load circuits; and selected output terminals of selected other ones of said plurality of load cells being coupled together.

4. A universal logic gate for synthesizing logic functions with a plurality of cascode circuits and a plurality of load circuits having input and output terminals, each of said cascode circuits comprising:

first, second, third and fourth switching means for providing four switch current paths from first, second, third and fourth current node terminals, respectively, said first switching means being coupled to said second switching means for providing a first main current path, said third and fourth switching means being coupled for providing a second main current path;

said first switching means having a plurality of signal input terminals for controlling said switch current in said first and second current paths;

said fourth switching means having a plurality of signal input terminals for controlling said switch current path in said third and fourth current paths;

fifth and sixth switching means being coupled to a switch current source for providing said first and second main current paths, respectively;

seventh switching means being coupled to said fifth switching means, said seventh switching means having a plurality of input terminals for controlling said switch current in said first and second main current paths;

selected ones of said four current paths being coupled and to said input terminals of selected ones of said plurality of load cells; and output terminals of selected ones of said plurality coupled together for providing an output signal.

5. A universal logic gate for synthesizing logic functions with a plurality of cascode circuits and a plurality of load circuits having input and output terminals, each of said cascode circuits comprising:

first, second, third and fourth transistor means for providing four switch current paths from first, second, third and fourth current node terminals, respectively, said first transistor means being coupled to said second transistor means for providing a first main current path, said third and fourth transistor means being coupled for providing a second main current path;

said first transistor means having a plurality of signal input terminals for controlling said switch current in said first and second current paths;

said fourth transistor means having a plurality of signal input terminals for controlling said switch current path in said third and fourth current paths;

fifth and sixth transistor means being coupled to a switch current source for providing said first and second main current paths, respectively;

seventh transistor means being coupled to said fifth transistor means, said seventh transistor means having a plurality of input terminals for controlling said switch current in said first and second main current paths;

selected ones of said four current paths being coupled and to said input terminals of selected ones of said plurality of load cells; and output terminals of selected ones of said plurality coupled together for providing an output signal.

6. A universal logic gate for synthesizing logic functions utilizing a cascode circuit, comprising:

first, second, third and fourth transistor means for providing four switch current paths from first, second, third and fourth current node terminals, respectively, said first transistor being coupled to said second transistor for providing a first main current path, said third and fourth transistor means being coupled for providing a second main current path;

said first transistor means having a plurality of signal input terminals for controlling said switch current in said first and second current paths;

said fourth transistor means having a plurality of signal input terminals for controlling switch current in said third and fourth current paths;

fifth and sixth transistor means being coupled to a switch current source for providing said first and second main current paths respectively;

seventh transistor means being coupled to said fifth transistor means, said seventh transistor means having a plurality of input terminals for controlling said switch current in said first and second main current paths; and first and second load circuits, said first load circuit being coupled to said first current node, said second and third current nodes being coupled to said second load circuit, said first load circuit providing an output function and said second load circuit providing the complement function.

7. A universal logic gate for synthesizing logic functions utilizing a cascode circuit, comprising:

first, second, third and fourth transistor means for providing four switch current paths from first, second, third and fourth current node terminals, respectively, said first transistor being coupled to said second transistor for providing a first main current path, said third and fourth transistor means being coupled for providing a second main current path;

said first transistor means having a plurality of signal input terminals for controlling said switch current in said first and second current paths;

said fourth transistor means having a plurality of signal input terminals for controlling switch current in said third and fourth current paths;

fifth and sixth transistor means being coupled to a switch current source for providing said first and second main current paths respectively;

seventh transistor means being coupled to said fifth transistor means, said seventh transistor means having a plurality of signal input terminals for controlling said switch current in said first and second main current paths; and first and second load circuits, having input and output terminals said first load circuit input terminal being coupled to said first and third collector current nodes for providing an output function, said second and fourth collector current nodes being coupled to said input terminal if said second load circuit for providing a complement function.

8. A universal logic gate for synthesizing logic functions utilizing 2 first and second cascode circuits, each cascode circuit comprising:

first, second, third and fourth transistor means for providing four switch current paths from first, second, third and fourth current node terminals, respectively, said first transistor being coupled to said second transistor for providing a first main current path, said third and fourth transistor means being coupled for providing a second main current path;

said first transistor means having a plurality of signal input terminals for controlling said switch current in said first and second current paths;

said fourth transistor means having a plurality of signal input terminals for controlling switch current in said third and fourth current paths;

fifth and sixth transistor means being coupled to a switch current source for providing said first and second main current paths respectively;

seventh transistor means being coupled to said fifth transistor means, said seventh transistor means having a plurality of input terminals for controlling said switch current in said first and second main current paths; and first and second and third load circuits being coupled to said cascode circuits, said load circuits having input and output terminals, said input terminals being coupled to said first collector current nodes of said first and second cascode circuits, respectively, said second and third collector current nodes of said first and second cascode circuits being coupled to said input terminal of said third load circuit, said output terminals of said first and second load circuit being coupled for providing an output function, and said second load circuit providing a complement function.

9. A universal logic gate for synthesizing logic functions utilizing a cascode circuit, each of said cascode circuits comprising:

first, second, third and fourth transistor means for providing four switch current paths from first, second, third and fourth current node terminals, respectively, said first tranistor being coupled to said second transistor for providing a first main current path, said third and fourth transistor means being coupled for providing a second main current path;

said first transistor means having a plurality of signal input terminals for controlling said switch current in said first and second current paths;

said fourth transistor means having a plurality of signal input terminals for controlling switch current in said third and fourth current paths;

fifth and sixth transistor means being coupled to a switch current source for providing said first and second main current paths respectively;

seventh transistor means being coupled to said fifth transistor means, said seventh transistor means having a plurality of input terminals for controlling said switch current in said first and second main current paths; and first, second and third load circuits being coupled to said cascode circuits, said load circuits having input and output terminals;

said first and third collector current nodes of said first cascode circuit be coupled to said input terminal of said first load circuit;

said second and fourth collector current nodes of said first cascode circuit and said second and third collector current nodes of said second cascode circuit being coupled to said input terminal of said third load circuit;

said first collector current node of said second cascode circuit being coupled to said input terminal of said second load circuit for providing an output complement function; and said output terminals of said first and second load circuits being coupled together for providing an output function.

10. A universal logic gate for synthesizing logic functions utilizing a cascode circuit, each of said cascode circuits comprising:

first, second, third and fourth transistor means for providing four switch current paths from first, second, third and fourth current node terminals, respectively, said first transistors being coupled to said second transistor for providing a first main current path, said third and fourth transistor means being coupled for providing a second main current path;

said first transistor means having a plurality of signal input terminals for controlling said switch current in said first and second current paths;

said fourth transistor means having a plurality of signal input terminals for controlling switch current in said third and fourth current paths;

fifth and sixth transistor means being coupled to a switch current source for providing said first and second main current paths respectively;

seventh transistor means being coupled to said fifth transistor means, said seventh transistor means having a plurality of input terminals for controlling said switch current in said first and second main current paths; and first, second and third load circuits being coupled to said cascode circuits, said load circuits having input and output terminal;

said first and third collector current nodes of said first cascode circuit being coupled to said input terminal af said first load circuit;

said first and third collector current nodes of said second cascode circuit being coupled to said input terminal of said second load circuit, said output terminals of said first and second load circuits being coupled together for providing an output function; and said second and fourth collector current nodes of said first and second cascode circuits respectively being coupled to said input terminal of said third load circuit for providing an output complement function.

* * * * *